Aug. 10, 1965  A. J. PHILLIPS ETAL  3,199,977
METHOD AND APPARATUS FOR MELTING COPPER
Filed June 22, 1962  7 Sheets-Sheet 1

INVENTORS
ALBERT J. PHILLIPS
RICHARD BAIER
BY Elwood J. Schaffer
ATTORNEY

Aug. 10, 1965　　A. J. PHILLIPS ETAL　　3,199,977
METHOD AND APPARATUS FOR MELTING COPPER
Filed June 22, 1962　　7 Sheets-Sheet 3

INVENTORS
ALBERT J. PHILLIPS
RICHARD BAIER
BY Elwood J Schaffer

ATTORNEY

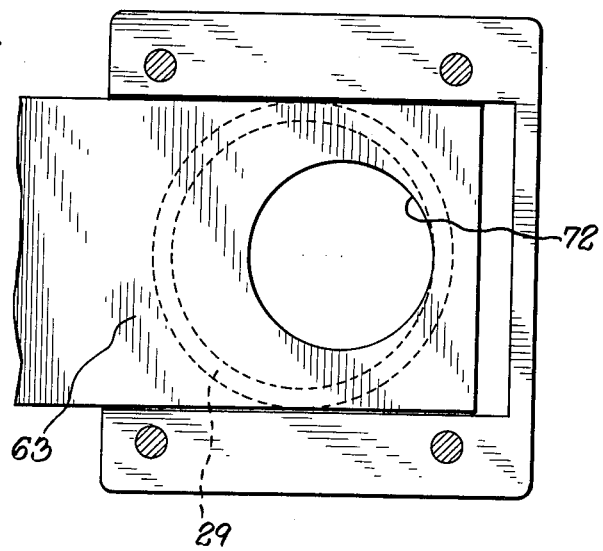
Fig.10.
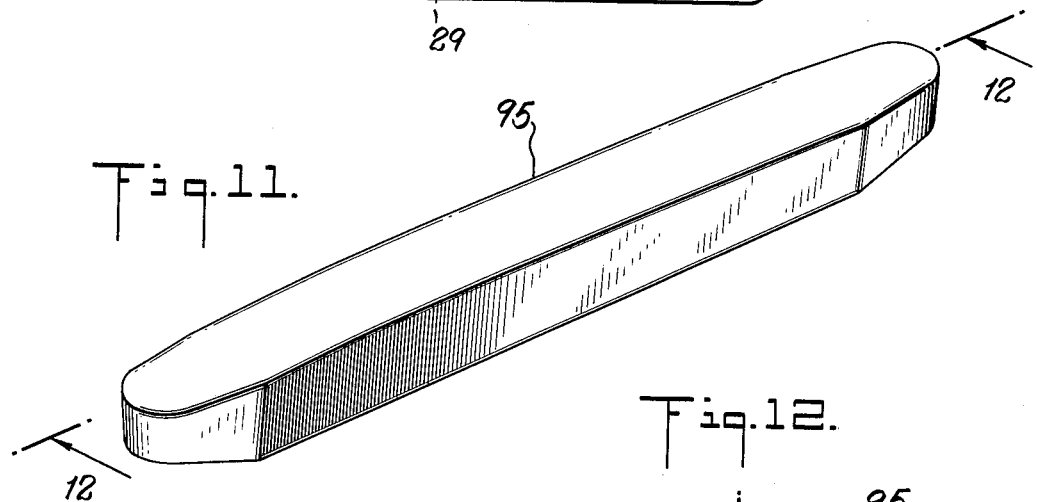
Fig.11.
Fig.12.
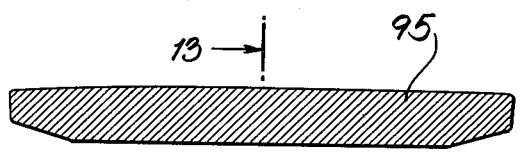
Fig.13.
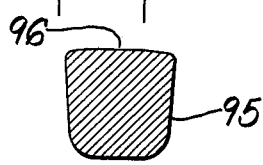
INVENTORS
ALBERT J. PHILLIPS
RICHARD BAIER

United States Patent Office 3,199,977
Patented Aug. 10, 1965

3,199,977
METHOD AND APPARATUS FOR
MELTING COPPER
Albert J. Phillips, Plainfield, and Richard Baier, New
Brunswick, N.J., assignors to American Smelting and
Refining Company, New York, N.Y., a corporation of
New Jersey
Filed June 22, 1962, Ser. No. 204,413
21 Claims. (Cl. 75—76)

This invention relates to method and apparatus for melting copper with hot gases in a vertical furnace without incorporating unwanted amounts of oxygen into the copper during the melting. More particularly, it relates to melting copper cathodes with such gases in such a furnace without incorporating unwanted amounts of oxygen or sulphur into the copper, thereby avoiding the necessity of blowing and poling the molten metal before casting; and to a novel copper wire bar product which is cast from the molten metal.

Heretofore, the art has made many attempts to melt copper in a vertical fuel-fired furnace. However, the prior attempts were metallurgically unsuccessful in that the copper was contaminated during the melting with unacceptable amounts of oxygen and sulphur. One consequence of such failure has been that, despite certain recognized potential advantages in such melting, copper cathodes have heretofore never been melted industrially in a vertical fuel-fired furnace. Instead, for want of a better procedure, the industry has, up to the present, melted such cathodes either in electrical furnaces or in conventional reverberatory furnaces employing radiant heat and then subjecting the molten copper to blowing and poling to remove sulphur and oxygen before casting the copper.

The invention is particularly useful in melting copper cathodes. As is known in the art, copper cathodes are produced industrially in an electrolytic refining process employing impure copper as anodes, a suitable electrolyte—for example, a water solution of sulphuric acid and copper sulphate, and so-called copper starting sheets, which are relatively thin sheets of commercially pure copper, as cathodes. During the electrolysis, copper dissolves from the anodes into the electrolyte from which it is deposited as commercially pure copper on the starting sheets to form the copper cathodes. After a sufficient amount of copper has been thus deposited, the cathodes are removed from the electrolyte and washed to remove as much as practicable of the electrolyte adhering thereto. In practice, anodes and cathodes of the same general size and shape are employed. Generally, they are flat shapes in which the flat surfaces are either rectangular or, more usually, square; the dimensions of the sides of the flat surface ranging from about 25 inches to about 40 inches, although in some instances larger or smaller sizes are produced. In general also, the cathodes are removed from the electrolyte when, due to copper deposition, they have reached a thickness of about ½ to 1 inch although, here again, cathodes of greater or lesser thickness are produced.

Although the cathodically deposited copper is commercially pure except for unavoidable minor amounts of sulphates physically present on the surface of the cathodes or occluded therein, the copper cathodes generally are not used per se because of their shape and physical properties, especially the grain structure of the cathodically deposited copper. To place them in more useful form, the cathodes must be melted and the molten metal cast into one or more semi-finished forms—for example, cakes, ingots, bars such as wire bars, billets and rods and similar shapes from which finished products are produced, such as, for example, sheets, wire, tubes, and the many other commercial products fabricated of commercially pure copper. Moreover, where for any reason the copper becomes contaminated with commercially unacceptable amounts of oxygen and sulphur during the melting, it is essential that the sulphur and oxygen in the molten copper thereafter be reduced to acceptable amounts by blowing and poling, before the molten metal is cast.

One of the most important advantages of the invention is that it enables copper shapes, especially copper cathodes, to be melted in a vertical fuel-fired furnace without incorporating unwanted amounts of oxygen into the copper during the melting. Another important advantage is that it enables such melting to be accomplished without incorporating unwanted amounts of sulphur into the copper. A further important advantage is that practice of the invention permits copper cathodes to be melted so as to provide a ready supply of molten commercially pure copper which, without blowing or poling, meets the more exacting present day requirements as to contained oxygen and sulphur. Thus, under today's requirements, molten commercially pure copper for casting should contain less than about .05% by weight of oxygen and in most instances its oxygen content should be less than .035% by weight. Molten copper meeting such requirements as well as molten copper which contains less than .01% and as little as .002% or less by weight of oxygen is produced by practice of the invention. Moreover, molten copper of low oxygen content can be produced consistently; this being a particularly important advantage in that the invention enables relatively uniform copper products to be cast. Thus, for example, low residual phosphorous deoxidized copper (so-called D.L.P. copper) which contains as little as .005% by weight of added phosphorous to effect deoxidation of the last traces of oxygen in the copper, can be readily and uniformly produced.

Similarly, such molten copper containing less than .002% by weight of sulphur and as little as less than .001% and as low as .0003% by weight or less of sulphur can be produced. In addition, the invention may be practiced to provide a desired set on the surface of the cast copper, which set may be concave, convex or level; this feature being especially advantageous in casting copper in conventional closed bottom molds into wire bars having a so-called level set, i.e., a flat or a raised (slightly convex) set.

Another very important advantage of the invention is that it enables the copper to be melted in a vertical fuel-fired furnace substantially without the production of slag or the necessity of adding slag or slag forming materials to the furnace. One result of this feature is that consumption of furnace refractory, per ton of copper melted, is decreased below that of prior fuel melting processes. Moreover, there is little, if any, contamination of the molten copper due to iron contained in the furnace refractories and molten copper containing less than .001% by weight and as little as .0003% and as low as a trace can be produced.

In addition, because of the low iron, sulphur and oxygen content of the metal, the invention provides a novel wire bar having a level set and containing, by weight, about .01 to about .035% oxygen and from a trace to .0007% each of iron and sulphur from which product a wire of novel properties is produced. Preferably, within these ranges, the novel wire bar contains, by weight, less than .03% oxygen and less than .0005% each of iron and sulphur. As used herein, "trace" means a detectable but quantitatively unmeasurable amounts of the iron and sulphur.

Another important advantage provided by the invention is that a desired flow of molten copper can be had within minutes of starting the furnace and the flow of copper can likewise be stopped in a matter of minutes so that copper can be melted to supply molten metal as the latter is needed. This latter feature provides another important advantage over the melting procedures practiced by the industry in that, with such procedures, it has been necessary first to completely melt a relatively large quantity of copper and then tap metal as needed from the completely molten pool; such practice being attended by the serious disadvantage of, and the very serious hazards arising from, the necessity of holding a relatively large quantity of molten metal for comparatively long periods of time. A further important advantage of the invention is that it affords comparatively large reductions in the capital and operating costs of melting copper cathodes. These as well as other advantages will be apparent to those skilled in the art from the following detailed description of the invention.

In arriving at the invention, attempts were made to melt copper cathodes in a vertical furnace by direct contact with hot products of combustion obtained by burning natural gas with an insufficient amount of air to burn the natural gas completely. A column of cathodes was maintained in the furnace during the melting. The hot products of combustion were injected into the furnace from a plurality of burners mounted in the furnace wall in each of a plurality of banks with the burners in each bank in spaced relationship to each other about the furnace perimeter and the banks in spaced vertical relationship to each other with the lowermost bank adjacent the furnace bottom. The hot products of combustion were supplied to the furnace in a sufficient amount and at a sufficient rate to melt copper and to provide a reducing atmosphere in the furnace; such reducing atmosphere comprising hydrogen and carbon monoxide resulting from the incomplete burning of the fuel.

In order to prevent introduction of extraneous oxygen into the furnace due to leakage of air therein through the burner ports and through the furnace refractories which are characteristically porous and permeable to gases, the side walls and bottom of the furnace were fabricated as a welded steel shell lined with refractory brick and the burners were enclosed burners. Each of these burners was provided with a steel mounting plate and each burner was mounted in its respective port in the furnace side wall by tightly bolting the mounting plate to the steel shell to complete the latter and make it substantially gas tight. Moreover, each burner was supplied with a stream of fuel and a stream of an oxygen-containing gas which were united in the burner body and ignited therein and then injected into the furnace. The furnace was open at its top to provide an opening for charging cathodes therein as well as to provide an outlet for discharging combustion gases from the furnace and the molten copper was withdrawn through an open tap hole at the furnace bottom.

In the course of making the foregoing attempts, it was found that the copper became contaminated with unwanted amounts of oxygen despite the reducing atmosphere that was maintained in the furnace during the melting. It was thought that such contamination might be caused by intrusion of atmospheric air into the furnace inasmuch as the furnace was open to the atmosphere at its top and at the tap hole. To test whether such intrusion of air was occurring and, if so, whether it would cause oxygen contamination of the copper in the presence of the reducing furnace atmosphere, the firing rate of the burners was increased to increase the pressure of the reducing atmosphere in the furnace and then decreased to decrease such pressure. It was found that no change in the amount of oxygen contamination took place when the pressure was increased. No change in the amount of such contamination was found when the pressure was decreased so long as the pressure of the furnace atmosphere was sufficiently high inside the furnace to provide at the bottom of the furnace at the tapping spout a pressure which was at, or slightly higher than, the ambient atmospheric pressure. As the pressure in the furnace atmosphere was further decreased the oxygen content of the molten copper issuing from the furnace at the spout, as determined from a sample of the molten copper taken from the spout, increased. However, it was found that oxygen contamination through the spout could readily be prevented by directing into the tapping spout a reducing flame from a gas torch disposed outside of the furnace adjacent the spout. While these results indicated that oxygen contamination of the copper could occur by leakage of atmospheric air into the furnace and the desirability of reducing or preventing such leakage, they did not account for the unwanted oxygen contamination that occurred with higher pressure in the reducing furnace atmosphere.

It was then thought that the unwanted oxygen contamination of the copper may have occurred because the furnace atmosphere was not sufficiently reducing in character or capacity even though samples of the furnace atmosphere taken inside the furnace at its bottom through the tapping hole and in the upper portion of the furnace above the upper burners showed that the furnace atmosphere contained more than 2% by volume of hydrogen on a dry basis. To test this possibility the ratio of the fuel to air that was delivered to the furnace was changed by increasing the amount of fuel. As the ratio of the fuel to air delivered to the furnace was increased, the reducing capacity of the furnace atmosphere increased in that the concentration of the hydrogen in the furnace atmosphere increased; however, we were surprised to find that the oxygen content of the molten copper also increased. It was concluded from these results that, to eliminate or control oxygen contamination of the molten copper, it was not sufficient merely to provide a reducing furnace atmosphere during the melting of the copper in the furnace. It was also concluded that oxygen was being made available to the copper during the melting from an unexpected and, at this stage in our attempts, an unknown source.

In the course of making the foregoing attempts, the copper in the furnace was observed through glass covered observation ports in the exterior end of each burner assembly. It was noted that melting of the copper was initiated at and above the uppermost burners at the outer edges of the cathodes in the column periphery and that melting of the copper increased at the lower bank of burners and was highest at the bottom of the column where the lowermost bank of burners were disposed adjacent the furnace bottom. It was noted too that as the bottom and lower portion of the column was melted away, the unmelted portion of the individual cathodes comprising the column thereabove moved downwardly by gravity into the lower portion of the column where they in turn were melted; those unmelted portions of the individual cathodes which survived the descent in the column forming the bottom of the column where they served to support the column from the furnace floor until they in turn were completely melted.

In studying the column and the descent of the cathodes therein, it was noted that, regardless of the manner in which the cathodes were charged to the furnace, the column itself tended to assume the general shape and size of the furnace in that portion of the latter where the column existed. Thus, as copper was melted from the column and the cathodes therein became somewhat soft, the cathodes shifted in their descent so as to cause portion of the column to contact the inside walls of the furnace so that, in those portions of the furnace walls where the burner ports were disposed, a small portion of the descending cathodes, in moving downwardly in the furnace, passed immediately in front of the burner ports provided in the furnace walls or in close proximity thereto. As seen through the observation ports, the column possessed voids and spaces between cathodes depending upon the arrangement as they descended. However, the lower portion of the column seemed to be somewhat more compact than the upper portion due, we believe, to the somewhat softened state of the copper and the weight of the cathodes thereabove.

In observing the melting of the solid copper as the latter moved past the burner ports in the furnace, it was noted that, when the cathodes moved past a burner port immediately in front of or closely adjacent thereto, islands of dark film formed and floated on the surface of such of the copper as became molten on the surface of the cathodes. The islands appeared to form and grow from a point or points on the surface of the molten copper and then to move rapidly away from the point or area of their generation and to vanish from the surface of the molten copper. It was also noted that when the cathodes moved past the burner ports in a path disposed at a greater distance from the burner outlet, the size of the floating islands and their frequency of formation were decreased as such distance increased until the islands ceased to form.

The composition of the gas in the furnace in front of the burners was determined. Samples of the gas were taken through a water-cooled tube inserted into the path of the stream issuing from the burners and then analyzed. Analysis of the samples showed that, along with products of combustion, the gas contained various amounts of unburned fuel material and unburned oxygen and that these unburned constituents persisted in the gas for a distance in front of the burners. Further study of the composition of the gas samples indicated that the unburned constituents persisted in a small irregular volume of elongated shapes projecting into the furnace in the space in front of each burner with the base of the shape disposed at the burner outlet. The study also indicated that the cross-sectional area of the small irregular elongated shape, which at its base was smaller than that of the burner outlet, diminished progressively until it disappeared and that the concentration of the unburned constituents in the shape likewise diminished progressively and disappeared at the end of the shape. In the preferred burners disclosed hereinafter, the small irregular elongated volume was a pencil-like shape but which conformed generally to the cross-sectional shape of the burner outlet into the furnace. For convenience, the small irregular volume of elongated shape found in front of each of the burners will, hereinafter, be referred to as a "pencil" shape.

The study further indicated that, under the particular conditions existing when the gas samples were taken, only a minor portion of the furnace volume was occupied by the combined volumes of the pencil shapes. In addition, observation of the column through the observation ports indicated that, of the total copper moving downwardly in the furnace (i.e., both the solid copper in the column and the molten copper which dripped from the solid copper and fell to the bottom of the furnace) only a small proportion moved past the burner ports and, of that small proportion, a still smaller portion passed through any part of any of the pencil shapes or made any kind of contact therewith. From these results and observations it was concluded that, in view of the small amount of contact between the copper and the diminishing amount of unburned oxygen in the pencil shaped volume of gas in front of the burner ports, oxygen contamination of the molten copper could not be expected to be accounted for by the presence of such pencil shapes. Moreover, this conclusion appeared to be supported by the above described phenomena of the film islands on the surface of the molten copper. Thus, assuming the islands of film floating on the surface of the molten copper were islands of copper oxide formed by a preferential reaction of the unburned oxygen with the molten copper rather than with the fuel, the fact that the islands vanished as they moved out of the pencil shaped gas volume indicated that the copper oxide was probably reduced by the more reducing atmosphere in the furnace generally. On the other hand assuming the islands to be islands of carbon caused by decomposition of the fuel, such carbon would also be expected to reduce copper oxide if the latter could be expected to form in the presence of the carbon. Consequently, the formation and disappearance of the film islands, in either event, indicated that the source of the oxygen contamination of the copper could not be expected to be the unburned oxygen in the gas.

As noted earlier, however, in the attempts to increase the reducing capacity of the furnace atmosphere by increasing the ratio of the natural gas to air delivered to the furnace, the oxygen contamination of the molten copper increased despite the increase in the reducing capacity of the overall furnace atmosphere. The foregoing work was repeated to determine the effect, if any, of the changing ratio upon the pencil shaped volume of gas in front of the burners. It was found that the pencil shape increased in cross-section and length when the natural gas in the ratio was increased and that the cross-section and length decreased when the natural gas in the ratio was decreased. However, contrary to our expectation, it was found that oxygen contamination of the copper also increased with the increase in the size of the shapes and decreased when the size of the pencil shapes was decreased.

We do not wish to be bound by any particular theory; however, we believe a critical factor in the invention is that oxygen contamination of the copper during the melting is due to the ability of molten copper to dissolve relatively large quantities of its own oxide as compared to other industrial metals. Thus, the above described film islands, assuming them to be islands of copper oxide, may nevertheless be the source of oxygen contamination in that some of the oxide is dissolved before the film is reduced. The amount of oxygen contamination that may occur in the pencil shapes under any given conditions existing therein may then depend upon the time afforded the molten copper to dissolve the oxide by the differential between the rate of formation of the film islands and the rate of reduction of the oxide by the more reducing gases in the furnace atmosphere surrounding the elongated shapes. Such of the oxide as is dissolved in the molten copper may then become diluted therein so that its removal from the molten metal tapped from the furnace would require a comparatively long treatment of the molten metal under relatively severe reducing conditions such as are afforded by conventional poling.

In any event, in melting a column of copper shapes in the fuel-fired vertical furnace, it appears that the fact that a portion of the copper in the column moves downwardly in the furnace against or in close proximity to the furnace walls, and the existence in front of the burners of a volume of gas containing unburned oxygen, are factors of critical importance in the contamination of the molten copper with unwanted amounts of oxygen. In further research work described more fully hereinafter, it was discovered that such unburned oxygen could be reduced in amount or substantially eliminated by controlling the conditions in the gases injected into the furnace prior to their injection therein.

The invention is based on the foregoing discoveries. Broadly, in one aspect, it comprehends melting a column of copper shapes in a vertical furnace in a reducing atmosphere by direct contact of the column with hot products of combustion supplied by injecting into the furnace a melting stream obtained by uniting a stream of a fuel with a stream of an oxygen-containing gas in amounts to provide insufficient oxygen in the melting stream to completely burn the fuel (said melting stream being ignited after the uniting step and before contact with the copper to be melted), and providing predetermined reducing conditions in the melting stream prior to its injection into the furnace, such reducing conditions being controlled to control any unwanted oxidizing effect arising from the presence of any unburned oxygen in the injected melting stream thereby preventing the incorporation of an unwanted amount of oxygen into the copper during the melting. For most industrial use, the predetermined reducing conditions should be such that any oxygen incorporated into the copper is less than .05% by weight of the copper during the melting. Preferably, the predetermined reducing conditions are such that less than .035% and most preferably less than .01% by weight of oxygen are incorporated into the molten copper.

In practicing the invention, the melting stream may be injected into the furnace as one stream or as a plurality of streams. Where a plurality of streams is employed as the melting stream, one or more or all of the plurality of streams may be ignited separately; or, one or more or all of the plurality of streams may be separately united and each of the separately united streams may be ignited at any time after the uniting step and before contact with the copper to be melted. Thus, the melting stream may be injected into the furnace as a single united stream or as a plurality of united streams, or as a plurality of portions of a united stream or streams. Each separately united stream of a plurality of separately united streams is called herein a "unit stream." An injected stream is any united stream or unit stream which enters the furnace. It will be understood that the melting stream is the stream or streams in which the copper melts.

In additional research work, a column of copper shapes was melted in a vertical furnace in which the melting stream was injected into the furnace as a plurality of unit streams. Each of the latter was obtained by separately uniting a stream of a fluid fuel with a stream of an oxygen-containing gas in a burner body and each of the separate unit streams was ignited before being injected into the furnace from its burner. It was discovered that, in each of the unit streams prior to its injection into the furnace, the total oxygen content found in samples of the unit stream was different for samples taken at different points in a plane perpendicular to the path of flow of the unit stream and that, as between the unit streams, such differences in total oxygen were different although no variation occurred in the average ratio of the fuel to the oxygen-containing gas delivered to the furnace by the melting stream (i.e. by all of the unit streams taken as one stream). It was also found that such differences in the total oxygen content affected oxygen contamination of the molten copper. Thus it was found that, when the difference between the highest and lowest total oxygen content found in the melting stream was increased, the oxygen content of the molten copper increased and that, when the difference between the highest and lowest total oxygen content found in the melting stream was decreased, the oxygen contamination of the molten metal decreased.

In accordance with the foregoing discovery, another feature of the invention comprises controlling the reducing conditions in the gases injected into the furnace by reducing the differences in the total oxygen content found in the melting stream across a plane perpendicular to the path of the melting stream to a value below a predetermined value prior to injecting the melting stream into the furnace. In practicing this feautre of the invention, where the melting stream is obtained by a single uniting step, the situs of such perpendicular plane may be selected at any place in the melting stream before injection into the furnace. Preferably, such plane is located at a point in the melting stream where the latter is still a single stream. Where the melting stream is composed of a plurality of unit streams, a perpendicular plane may be located in each unit stream at a situs selected in each unit stream between the point of formation of the unit stream and the point of its injection into the furnace. Preferably, the situs of the plane in each unit stream is in the same relative position in all of the unit streams. Preferably, also the plane in each unit stream is located at a point in the stream where the latter is still a single stream. It will be understood that the total oxygen content at a point taken in a plane perpendicular to the path of flow of a stream is intended to mean the percentage by volume of all of the oxygen, whether free or combined, which is found by analysis of a gas sample taken at a point in the plane and that such sample may be analyzed in any suitable manner to determine, either directly or indirectly, the total oxygen content thereof; such total oxygen content being herein called "total oxygen content."

Further investigation of the above described differences in the total oxygen content showed that the size of the portion of the melting stream having the differing total oxygen content and the amount of copper melted thereby also affected the amount of oxygen contained in the molten copper. Thus, it was found that, where the highest and lowest total oxygen content occurred in only a relatively small portion of the area of the plane perpendicular to the path of the melting stream, the magnitude of the difference between the highest and lowest total oxygen content had correspondingly smaller effect on the amount of oxygen incorporated into the molten copper. With respect to this aspect of the invention it is more convenient, to refer to variations in the total oxygen content in the plane perpendicular to the path of the melting stream in terms of the difference between the average total oxygen content of the melting stream which is intended to be supplied by the amounts of the total fuel and the total oxygen-containing gas delivered to the furnace by the melting stream, and the highest total oxygen content found in the plane perpendicular to the path of the melting stream.

In producing molten copper containing less than .05% by weight of oxygen, the spread in total oxygen content found in the plane perpendicular to the path of the melting stream should preferably be controlled so that the difference (i.e. spread), between the average total oxygen content intended for the melting stream and the highst total oxygen found in at least a preponderant proportion (and more preferably in substantially all) of said perpendicular plane is maintained below a predetermined value. This predetermined value is less than the value "K" in the following equation:

$$K = \frac{.0632A}{B + .01A}$$

in the equation, "A" is the percent by volume of oxygen contained in the oxygen containing gas employed to form the melting stream. "B" is the stoichiometric (theoretical) amount of pure oxygen in volumes of oxygen at standard conditions (i.e. 68° F. and atmospheric pressure) which are required to completely burn one volume of the fuel (considered as a gas at the same standard conditions) which is employed to form the melting stream. Preferably, in producing molten copper containing less than .035% by weight of oxygen, the spread between the highest total oxygen content found in the plane perpendicular to the path of the melting stream and the average total oxygen content intended for the melting stream is maintained below a predetermined value which is less than two-thirds of the value of "K" in said equation in at least a preponderant portion, and more preferably in substantially all, of said perpendicular plane. In producing molten copper containing less than .01% by weight of oxygen, the spread between the highest total oxygen found in substantially all of said perpendicular plane and the average total oxygen content intended for the melting stream is preferably less than one-third of the value of "K" in said equation. Where the melting stream is composed of a plurality of unit streams, the spread between the average total oxygen content intended for the melting stream and the highest total oxygen content found in the perpendicular planes across the paths of at least a preponderant number, and more preferably of all, of the unit streams is preferably maintained below a predetermined value which is less than the above stated values of "K" in producing molten copper having an oxygen content in the above given ranges. As used in this specification and in the claims the terms "preponderant," "major" and "minor" mean approximately 75%, approximately 50% and approximately 25%, respectively.

Examples of the value of "K" in the foregoing equation for various fuels with air or pure oxygen as the oxygen containing gas in the melting stream for the indicated values of "B" that were employed, are given in the following table.

| Fuel | K for air | K for oxygen | B |
|---|---|---|---|
| CO | 1.87 | 4.21 | ½ |
| $H_2$ | 1.87 | 4.21 | ½ |
| Methyl alcohol ($CH_3OH$) | 0.776 | 2.53 | 1½ |
| Natural gas (assumed to be $CH_4$) | 0.60 | 2.11 | 2 |
| Ethyl alcohol ($C_2H_5OH$) | 0.414 | 1.58 | 3 |
| Propane ($C_3H_8$) | 0.255 | 1.05 | 5 |
| Kerosene (assumed to be $C_{12}H_{26}$) | 0.071 | 0.324 | 18.5 |
| Gasoline, diesel oil, gas oil and other natural or synthetic liquid hydrocarbon fuels | 0.07 | 0.32 | 18.5 |

In accordance with the value of "K" given in the above table, where, for example, natural gas (assumed to be $CH_4$) is employed as the fuel and air is employed as the oxygen containing gas in forming the melting stream, the spread between the average total oxygen content intended for the melting stream and the highest total oxygen content found in at least a preponderant proportion (and preferably in substantially all) of said perpendicular plane in the melting stream is preferably maintained below a predetermined value which is less than approximately 0.6 total oxygen content in producing molten copper containing less than .05% by weight of oxygen. Preferably, in producing molten copper containing less than .035% by weight of oxygen when natural gas and air are used to form the melting stream, the spread between the highest total oxygen content found in the perpendicular plane in the melting stream and the average total oxygen content intended for the melting stream is maintained below a predetermined value which is less than approximately 0.4 total oxygen content in at least a preponderant portion (and more preferably in substantially all) of the perpendicular plane. In producing molten copper containing less than .01% by weight of oxygen, the spread between the highest total oxygen content found in substantially all of the perpendicular plane of the melting stream and the total oxygen content intended for melting stream is less than approximately 0.2 total oxygen content.

To further illustrate the foregoing equation, the value of "K" given in the above table for natural gas and air is determined as follows. The value of "A" for air is 21% (i.e. the percent by volume of the oxygen contained in air). The stoichiometric amount of oxygen in volumes required to completely burn one volume of natural gas (assumed to be $CH_4$) is given by the equation:

$$CH_4 + 2O_2 \rightarrow CO_2 + 2H_2O$$

Therefore the value of "B" is 2. Accordingly the value of "K" is given by the equation:

$$K = \frac{.0632A}{B + .01A} = \frac{.0632 \times 21}{2 + (.01 \times 21)} = 0.60$$

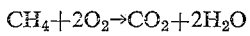

The foregoing equation is further illustrated by the following determination of the value of "K" given in the above table using a liquid fuel, such as kerosene, and air to form the unit stream. The value for "A" is again 21% as given in the previous example. The value of "B" from the following equation is 18.5:

$$2C_{12}H_{26} + 37O_2 \rightarrow 24CO_2 + 26H_2O$$

Accordingly, the value of "K" is:

$$K = \frac{.0632A}{B + .01A} = \frac{.0632 \times 21}{18.5 + (.01 \times 21)} = .071$$

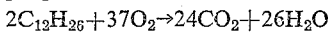

As indicated earlier, the ratio of the fuel to the oxygen containing gas that is employed in the melting stream also affects the amount of oxygen incoporated into the copper during the melting procedure. Even when the total oxygen content in the melting stream was controlled, as discussed above, it was found that the oxygen contamination of the molten copper was increased when the fuel in the ratio of fuel to oxygen containing gas was increased. Thus, when unpreheated natural gas was employed as the fuel and unpreheated air was employed as the oxygen containing gas in the melting stream and the latter was injected into the furnace as a plurality of unit streams (each of which was formed in its own separate burner and ignited therein before the particular unit stream was injected into the furnace), it was found that, as the amount of natural gas in the melting stream was increased to decrease the relative amount of oxygen in the melting stream (thereby increasing the oxygen deficiency), the size of the earlier described pencil shapes in front of the burners as well as the amount and concentration of unburned oxygen in the shapes increased. It was also found that the resulting decrease in the degree of combustion of the oxygen contained in the gases in the shapes was accompanied by an increase in the oxygen content of the molten copper in that copper containing as little as .002% or less oxygen increased to as much as .07%, by weight, even though the variation in the total oxygen content across the perpendicular plane in each of the unit streams and the variation in such total oxygen content between the unit streams prior to their injection into the furnace was less than 0.2 total oxygen content by volume.

Accordingly, in another aspect, the invention comprises controlling the size of said pencil shapes and the amount and concentration of unburned oxygen therein by providing a predetermined degree of combustion of the oxygen contained in the melting stream prior to injection into the furnace, thereby avoiding incorporating unwanted amounts of oxygen into the copper during melting. It has been found from experience with the foregoing feature that control of the unburned oxygen in the melting stream is most conveniently obtained by controlling the degree of combustion in the melting stream prior to its injection into the furnace, as indicated by the degree of combustion of the oxygen in the melting stream after the latter has traveled a given distance into the furnace. For convenient measuring purposes, we determine the unburned oxygen contained (on a dry basis) in a sample of gas taken at a point or points located in the furnace in front of the stream or streams about six inches from the furnace wall, and preferably in the longitudinal axis of the stream injected into the furnace, or in the longitudinal axis of one or more of such injected streams, which compose the melting stream. In avoiding the incorporation of unwanted amounts of oxygen into the copper during melting, and especially in producing molten copper containing less than .05% by weight of oxygen, the combustion of the oxygen initially contained in the melting stream before ignition is preferably controlled in the melting stream, prior to its injection into the furnace, to provide at least a minor degree of oxygen combustion, and more preferably a degree of oxygen combustion of at least 35%, in a preponderant proportion, and preferably in substantially all, of the melting stream by the time the latter has moved into the furnace a distance of about six inches from the furnace wall. In producing molten copper containing less than .035% by weight of oxygen, the combustion of the oxygen contained in the melting stream before ignition is preferably controlled in the melting stream, prior to its injection into the furnace to provide at least a major degree of oxygen combustion, and more preferably a degree of oxygen combustion of at least 70%, in a preponderant proportion, and preferably in substantially all, of the melting stream by the time the latter has moved into the furnace a distance of about six inches from the furnace wall. In producing molten copper containing less than .01% by weight of oxygen, the oxygen combustion is controlled to provide preferably at least a preponderant degree of oxygen combustion, and more preferably a degree of oxygen combustion of at least 85%, in a preponderant proportion, and preferably in substantially all, of the melting stream by the time the latter has moved about six inches into the furnace. For least oxygen contamination of the molten copper, the degree of oxygen combustion in the melting stream prior to its injection into the furnace should be such that substantially all (i.e. more than about 90%) of the oxygen initially present in the melting stream is burned before the melting stream has moved about six inches into the furnace.

It was found that the degree of combustion of the oxygen in the melting stream for any given ratio of the fuel to oxygen therein was increased by preheating the fuel stream or the oxygen containing gas stream or the melting stream or any one or more or all of these streams. The degree of combustion of the oxygen was also found to be increased for any given ratio of fuel to oxygen in the melting stream by employing an oxygen containing gas having an increased oxygen content, such as for example, enriched air.

It was also found that relatively small changes in the ratio of the fuel to the oxygen containing gas employed to form the melting stream caused relatively large changes in the degree of oxygen combustion in the melting stream when hydrocarbon fuels, particularly fluid and more particularly gaseous hydrocarbon fuels were used, and especially when natural gas was used as the fuel. Thus, for example, when unpreheated natural gas having a composition equivalent to $CH_{3.86}$ and a heating value of 1030 B.t.u. per cubic foot was employed as the fuel, an unpreheated air was employed as the oxygen containing gas in the melting stream and the latter was injected into the furnace as a plurality of unit stream (each of which was formed in a burner and ignited before injection into the furnace) it was found that the degree of oxygen combustion in the melting stream about six inches inside the furnace decreased from about 90% to about 25% as the percentage by volume of the oxygen introduced by the air into the melting stream was decreased from 18.95% to 18.50% oxygen, by volume, on the dry basis, in the melting stream.

Where hydrocarbon fuels, particularly fluid and especially gaseous hydrocarbon fuels are employed as the fuel and air is employed as the oxygen containing gas to form the melting stream, the ratio of the fuel to the air is preferably such as to provide in the melting stream prior to ignition an oxygen content which is below the theoretical (stoichiometrical) amount of oxygen required to completely burn the fuel but which oxygen content is not more than 0.6% oxygen, by volume, on the dry basis, below said theoretical amount of oxygen. Where natural gas is employed as the fuel and air is employed as the oxygen containing gas, the ratio of the fuel to the air delivered to the furnace is preferably such as to provide an oxygen content in the melting stream in the range of 18.50% to 18.95%, by volume, on the dry basis, in producing molten copper containing less than .05% by weight of oxygen. Preferably, the ratio is such as to provide oxygen in the range of 18.65% to 18.95%, by volume, on the dry basis, in the melting stream when producing molten copper containing less than .035% oxygen by weight. To produce molten metal containing less than .01% oxygen by weight, the ratio preferably is such as to provide 18.70% to 18.85% oxygen, by volume, on the dry basis, in the melting stream. For best results the ratio is such as to provide an oxygen content of 18.80%, by volume, on the dry basis, in the melting stream prior to ignition.

In operating the furnace in accordance with the invention, it was found that, when desired predetermined reducing conditions were established in the melting stream before injecting the latter in the furnace, the oxygen contained in the molten copper was thereafter determined by the intensity of the reducing condition provided in the furnace atmosphere proper. It has also been found that the molten metal issuing from the furnace is generally at a temperature in the range 2000 to 2150° F., and usually in the range 2020 to 2080° F. In practicing the invention to produce molten copper issuing from the furnace at a temperature in the foregoing range and containing less than .05% and as little as .002% or less by weight of oxygen, such furnace atmosphere preferably contains, by volume, on the dry dry basis, at least .5% carbon monoxide, when employing a hydrocarbonaceous fuel or a hydrocarbon fuel or the fuel comprises hydrogen and carbon monoxide. More preferably the furnace atmosphere contains about 2% hydrogen or 2% carbon monoxide, by volume, on the dry basis, when such fuels are employed.

In operating the furnace to melt copper which was contaminated with sulphate physically present on the surface of the copper or occluded therein as is the case with copper cathodes, it was found that little, if any, of the sulphur values in the sulphate were incorporated into the molten copper. It is belived that the sulphate is thermally decomposed in the upper portion of the furnace before melting of the copper occurs and that the sulphur values in the sulphate are released as gaseous oxides of sulphur, such as, for example, sulphur dioxide, which pass out of the furnace with the flue gas with little, if any, contact with molten copper. It has been found, however, that sulphur values contained in the melting stream injected into the furnace are substantially quantitatively incorporated into the molten copper from the melting stream. It has been found that any sulphur values thus incorporated into the molten copper remain in the metal unless subsequently removed therefrom with oxygen incorporated into the molten metal as by conventional blowing.

In accordance with another feature of the invention, the sulphur values in the melting stream injected into the furnace are maintained below a predetermined value. Thus, to produce molten metal containing less than .002% by weight of sulphur, the total sulphur values in the melting stream should be less than .0056% by volume on the dry basis, calculated as sulphur dioxide; and, to produce molten metal containing less than .001% sulphur by weight, the melting stream should contain sulphur values in amounts less than .0028% by volume on a dry basis, calculated as sulphur dioxide. Such sulphur values in the melting stream are most easily obtained by employing a fuel which possesses a sufficiently low amount of sulphur values. It has been found that to produce molten copper containing .002% or less by weight of sulphur, a fuel containing less than .04 pounds of sulphur per million British Thermal Units (B.T.U.) should be employed; and, to produce molten metal containing less than .001% or less by weight of sulphur the fuel should contain less than .02 pound of sulphur per million B.t.u. It will be understood that the term "pounds of sulphur per million B.t.u." means the total weight of sulphur values, calculated as sulphur, contained in that amount of the fuel in question which, when burned with a stoichiometrical amount of air, liberates one million B.t.u. of heat.

The invention may be practiced to melt copper of any composition possessing any shape or mixture of shapes without incorporating unwanted amounts of oxygen into the copper during the melting. As already indicated, the invention is especially useful in melting commercially pure copper, particularly refined copper such as copper cathodes. In addition to copper cathodes, commercially pure copper to be melted may be encountered as fire refined copper in various shapes or as copper scrap either as refinery scrap or as a high quality scrap known in the trade as No. 1 Copper Wire Scrap and No.

1 Heavy Copper Scrap. As is known in the art, refinery scrap is composed of copper scrap produced in the electrolytic copper tankhouse in the form of strips and clippings from the cathodes and scrap in the form of skulls, shells, worn-out copper molds and rejected castings produced in casting commercially pure copper shapes. The quality of No. 1 Copper Wire Scrap and No. 1 Heavy Copper Scrap is defined in Circular NF–58, dated August 1, 1958, entitled "Standard Classification for Non-Ferrous Scrap Metals," published by the National Association of Secondary Material Industries, Inc., New York, N.Y.

The vertical furnace may be any generally vertically disposed furnace of a desired shape or size which will support a column of any desired size and shape of the copper to be melted and allow the column, assisted by gravity, to move downwardly in the furnace as the copper is melted from the column. Thus, for example, the furnace may be generally square, rectangular or circular in shape. Preferably, the longitudinal axis of the furnace is disposed at an angle which will allow the column by its own weight to move downwardly in the furnace by gravity. Preferably, also the longitudinal length of the furnace is at least four feet and more preferably is at least as great as the largest transverse cross-sectional dimension of the furnace. The preferred furnace is circular in transverse cross-section with its longitudinal axis disposed substantially vertically upright (i.e. substantially 90° to the horizontal). In a furnace for melting cathodes, the preferred circular furnace is preferably more than about three and less than about eight feet, and more preferably five to six and one-half feet, in its inside diameter; and its height is preferably in the range from one to ten times the inside diameter of the furnace. In terms of the length of the column, the furnace is preferably sufficiently high to surround a column of copper which is four to thirty feet, and more preferably six to twenty feet in length.

The furnace may be constructed in any desired manner of any desired material. Preferably, the side walls and bottom of the furnace are fabricated into a substantially gas-tight steel shell, as by welding, and the shell lined with an acid, neutral or basic refractory; a high alumina refractory being at present preferred. The walls of the furnace may be straight or sloped in any desired manner and the furnace bottom may be constructed and arranged to provide a space in which the molten copper is collected before discharge from the furnace through a tap hole disposed in the side wall adjacent the furnace bottom; or, it may be constructed and arranged to discharge the copper without, or substantially without, collecting the molten metal in a pool. Preferably, the furnace walls are sloped inwardly in the bottom portion of the furnace and are straight thereabove. Preferably also the bottom of the furnace is sloped toward the tap hole which preferably is disposed at the lowest point of the furnace bottom so that the molten copper runs out of the furnace as soon as it reaches the furnace bottom without collecting in a pool.

As has been indicated earlier, in practicing the invention, the melting stream may be injected into the furnace as one or as a plurality of streams at one or a plurality of points or zones in the furnace and the uniting of the fuel and oxygen-containing gas may be accomplished in one or a plurality of steps. Also, ignition of the united stream or streams may be initiated at any time after the uniting step or steps and before the united stream or streams contact the copper to be melted. Thus, for example, the melting stream may be united in a single step and then delivered to a plurality of burners and ignited therein prior to injection into the furnace. While such a procedure may be used it is not one of the more preferred procedures because of the possibility of flash-back occurring in the melting stream. Likewise, the melting stream may be united in a single step and then burned and the hot products of combustion may then be delivered to a plurality of inlet ports in the furnace. While such a procedure may be used, it also is not one of the more preferred procedures since it would require the use of relatively long refractory conduits capable of withstanding extremely high temperatures. Preferably, the melting stream is composed of a plurality of unit streams each of which is injected into the furnace from its own burner body mounted on the furnace wall, each of the unit streams being ignited in its particular burner body and then injected into the furnace. In the most preferred procedure, a stream of fuel and a stream of the oxygen-containing gas are separately delivered to each burner body, each of which is provided with a uniting section for receiving and uniting the separately delivered streams of fuel and the oxygen containing gas and then delivering the unit stream to an immediately adjacent burner section in the burner body wherein the unit stream is ignited and then injected into the furnace.

The burner or burners may be mounted in the furnace walls so that the gases discharged therefrom are aimed directly at, or generally tangentially to, the column of copper; direct discharge being preferred inasmuch as it has been found to provide a higher melting rate. Preferably, a plurality of burners are mounted in the furnace walls in at least one bank in spaced relationship to each other about the furnace perimeter adjacent the bottom of the furnace. Preferably, such bank contains at least three burners. More preferably, a plurality of burners are mounted in the furnace walls in each of a plurality of banks with the burners in each bank in spaced relationship to each other about the furnace perimeter and each bank in spaced vertical relationship to each other with the lowermost bank adjacent the furnace bottom. This latter arrangement of the burners, especially in combination with inwardly sloping furnace walls in the bottom portion of the furnace is more preferred since it has been found that it assists in causing the bottom portion of the melting column of copper to assume a generally tapered shape, which in the case of a round furnace is a generally conical shape, such shape having also been found to provide a higher melting rate than would otherwise be obtained in its absence.

In operating the furnace, it has been found that for any given heat input into the furnace, the melting rate of the copper is affected by the proportion of the total heat absorbed by the copper as convection heat and the proportion which is absorbed as radiant heat; and, that the melting rate is increased when the heat absorbed by convection by the copper is increased. Preferably, the firing conditions are such that at least a major proportion, and more preferably at least a preponderant proportion of the total heat absorbed by the copper is absorbed as convection heat.

It has also been found that, under any given heat input, the amount of convection heat absorbed by the copper is affected by the velocity at which the melting stream is injected into the furnace; and, that increased velocities of the melting stream increase the amount of heat that is absorbed by copper as convection heat. Preferably, where the melting stream is injected into the furnace through a plurality of burners, the distribution of the burners together with the velocity of the gases ejected therefrom are such as to provide gases traveling in a generally flat path which path, when the furnace is empty, is approximately as long as the largest transverse cross-sectional furnace dimension. Thus, for example, in the preferred round furnace employing a plurality of burners in each bank spaced about the furnace periphery with each burner aimed radially inwardly, the velocity of the gases ejected from each burner is preferably sufficient to carry the gases from the burner across the center of the furnace in a substantially flat trajectory as determined when the furnace is empty. In furnaces in which the largest inside cross-sectional dimension is approximately seven feet or less, and in round furnaces having a diameter of approximately seven feet or less, the velocity of gases injected by the burners, at least in the lowermost banks, is preferably at least seventy-five feet per second at the actual temperature and pressure conditions existing in the bases as they leave the burner outlet and enter the furnace.

In addition, it has been found that, under any given conditions, the amount of heat absorbed by the copper as convection heat from the gases is dependent upon the temperature of the gases impinging upon the column and that increased temperatures in the impinging gas increased the amount of heat that is absorbed by the copper as convection heat. The temperature of the gases, obtained by burning any particular fuel and employing any particular ratio of fuel to oxygen-containing gas, may be increased by increasing the oxygen content of the oxygen-containing gas employed to form the melting stream or by preheating the fuel stream or the oxygen-containing gas stream or the melting stream prior to the latter's ignition, or anyone or more or all of such streams. Preferably, at least the stream of the oxygen-containing gas and more preferably also the fuel stream, are preheated as much as practicable. Preferably also where such gases are preheated, they are preheated to a temperature in the range of 300 to 1000° F. In the most preferred procedure, at least the stream of the oxygen-containing gas is preheated by indirect contact with the hot flue gases from the furnace.

Additionally, the melting rate has been found to be affected by the compactness of the column in that, under any given conditions, an increased degree of compactness of the column decreases the melting rate. It has also been found that the compactness or apparent density of the column can be controlled by the manner in which the copper is charged to the furnace so as to control the disposition of the copper shapes in the column. Thus, as illustrated hereinafter in Example 6, in melting copper cathodes in the furnace of the example under the given firing condition, it was found that, when the cathodes were charged to the furnace so that the individual cathodes rested on the top of the column in a substantially horizontal position with the cathodes in general vertical alignment to provide a relatively compact column, a melting rate of about thirty tons of copper per hour was obtained in the particular furnace. However, under the same firing condition, the melting rate increased to forty-five tons per hour when the cathodes were charged to the furnace so as to rest on the top of the column in an unaligned random position so as to provide a less dense and more open column. Preferably, random disposition of the cathodes is obtained by charging the cathodes to the furnace in increments each of which is a pile of horizontally disposed cathodes stacked about three feet high. The stacks are charged to the furnace by allowing them to fall or tumble into the top of the furnace from a loading machine. Observations of the column when the furnace was charged in this latter manner disclosed a "jackstraw" like disposition of the cathodes in the column. Accordingly, in practicing the invention, the charging of the furnace with the copper shapes to be melted may be controlled to control the apparent density of the column so as to control the rate at which the copper melts in the furnace. Preferably, the shapes are charged to the furnace in such a manner as to provide a random disposition of the shapes in the column.

In starting the furnace, either initially or after a shutdown which has allowed the refractory to become relatively cold, the furnace is fired, preferably at a low rate, for a sufficient time, generally less than one hour and usually for about fifteen to thirty minutes, to heat the refractory to at least a dull red so that little, if any, of the initially melted copper which falls upon the hot refractory will freeze thereon. Copper is then charged to the furnace to provide a column of desired height therein and the rate of firing is increased to the desired operating rate. Thereafter, copper, as needed, is charged, preferably intermittently or semi-continuously, to maintain the top of the column above a desired level in the furnace and copper is preferably melted continuously in the furnace. The molten copper may be collected in a pool in the bottom of the furnace and tapped therefrom either continuously or intermittently through the tap hole. Preferably, no pool is employed and the molten metal is allowed to flow freely through an open tap hole as fast as the copper melts in the furnace. The molten metal from the furnace may be delivered in any suitable manner to any desired location for further use. Preferably, the metal is allowed to flow from the tap hole into a heated launder which delivers it directly to casting means located adjacent the furnace or to a holding furnace from which holding furnace it may be delivered to appropriate casting means.

In stopping the furnace the charging of copper thereto is discontinued and, if it is desired to empty the furnace, the firing is continued until the remaining copper in the column is melted after which firing is ceased. After stopping the furnace in this manner, it may be started as described above and, where the refractory is still sufficiently hot, the slow firing period may be dispensed with. When there is no pool of molten metal maintained in the furnace during the melting as is the case in the preferred operating procedure, the furnace is stopped preferably by discontinuing the charging of metal and the delivery of fuel to the furnace while continuing to deliver thereto the air or oxygen-containing gas until the flow of molten metal from the furnace is stopped after which the latter gas is also turned off. Usually the flow of molten metal stops within about a minute after the supply of fuel to the furnace is shut off. Thereafter, if the furnace refractory has not become unduly cool, the furnace may be restarted merely by starting to fire at the desired operating rate and charging copper to the top of the column remaining in the furnace as needed. If the furnace refractory has become relatively cool, as for example when the furnace has been shut down over night, the furnace may be restarted by firing at a low rate for fifteen to thirty minutes or until copper starts to drip from the edges of the charge left in the furnace, before firing the furnace at the desired operating rate.

Operation of the furnace without maintaining a pool of molten metal therein during the melting, especially when practiced in conjunction with the preferred stopping procedure, is especially advantageous in that molten copper can be supplied as needed without the hazard, or the inconvenience, of the necessity of maintaining a large supply of molten metal in stock in the furnace. Thus, in starting with a cold furnace, molten metal can be supplied within fifteen to thirty minutes after start-up and full melting rate can be reached within the next fifteen to thirty minutes thereafter; and, when restarting a hot furnace, full flow of copper can be obtained within five minutes. Additionally, all flow of molten metal can be stopped quickly, usually in less than two minutes and more usually within one minute, with no molten metal remaining in the furnace when the preferred stopping procedure is practiced; this being especially advantageous in the event an emergency should arise which requires quick stoppage of flow of metal. Moreover, cooling the hot copper remaining in the furnace with the oxygen-containing gas during the preferred stopping procedure, has no apparent adverse effect upon the oxygen content of the copper produced when the thus cooled copper is melted upon restarting the furnace.

In operating the furnace continuously under various firing and charging conditions, it has been found that metal melted from the column may freeze in the bottom portion or on the bottom of the furnace and that such freezing can take place to such extent that plugging of the tap hole may occur. It was also found that such plugging can occur rapidly when practicing the above described charging procedure for providing the open condition in the column afforded by the described random disposition of the shapes in the column. Such plugging was found to be capable of occurring especially rapidly when such charging procedure was practiced in conjunction with the step of discharging the molten copper from the furnace as fast as the molten metal reached the furnace bottom so that no pool or no substantial pool of molten metal existed in the furnace bottom. From observations made through the burner observation ports, it appeared that freezing which can result in rapid plugging may be due, at least in part, to the fact that the more open character of the column which is provided by such charging procedure permits the column to move relatively rapidly into the bottom portion of the furnace or permits a portion of the column or individual pieces of the unmelted copper to fall into the molten copper contained at or flowing acorss the bottom of the furnace so as to unduly cool the molten copper before the latter is discharged from the furnace.

When, for any reason, the tap hole becomes plugged with frozen metal, it is essential to discontinue the melting in the furnace and to remove the frozen metal plug from the tap hole, after which the furnace may be restarted as described earlier herein. Preferably, the melting is stopped by shutting off the supply of fuel to the furnace while continuing to deliver thereto the air or oxygen containing gas so as to quickly stop the generation of molten metal in the furnace; the supply of the air or oxygen containing gas also being shut off as soon as melting stops.

It has been found, however, that the likelihood of such freezing of the molten metal in the furnace to the extent of plugging of the tap hole can be eliminated or greatly reduced by directing hot products of combustion into the bottom portion of the furnace, especially in that portion of the furnace volume defined by the lowermost three feet of the furnace, at a rate sufficient to supply heat to such bottom portion at more than about 1500 B.t.u. per minute per cubic foot of such portion on an empty furnace basis. As used herein, the lowermost three feet of the furnace refers to a linear measurement made on the central longitudinal axis of the furnace, starting at the furnace bottom and extending upwardly therefrom for a distance of three feet on the central longitudinal axis of the furnace. Preferably, one or a plurality of burners, and more preferably at least three burners, are disposed in the lowermost three foot portion, preferably with at least three burners as close as practicable to the furnace bottom (i.e. within about one foot of the bottom of the furnace), and the burners are fired at a sufficient rate on an empty furnace basis to inject hot products of combustion to provide at least 2000, and more preferably more than 3000, B.t.u. per minute per cubic foot of the lowermost three foot portion to avoid plugging of the tap hole due to such freezing of the molten metal. For large furnaces, for example, circular furnaces having a diameter in excess of five feet and more than ten feet high, heat is preferably introduced into the lowermost three foot portion at the rate of at least 10,000 B.t.u. per minute per cubic foot of the lowermost three foot portion.

It was found, contrary to what would be expected, that heat input at the above high rates did not increase oxygen contamination of the copper despite the increased number of burners or increased velocities needed to obtain such heat input rates. Instead, heat input at such rates actually appears to assist in avoiding oxygen contamination of the copper.

Any fuel, especially any fluid or fluidizable fuel may be used in practicing the invention. Preferably, the fuel is a fuel comprising hydrogen and carbon monoxide, such as for example, water gas or producer gas; or the fuel is a hydro-carbonaceous fuel (i.e. a fuel comprising carbon and hydrogen). Of such fuels, gaseous or liquid hydrocarbon fuels are more preferred, the preference being in the order stated; natural gas being the most preferred fuel. When the preferred fuels are employed in practicing the invention, they provide reducing constituents in the furnace atmosphere proper, which consist essentially of hydrogen and carbon monoxide as a result of the incomplete burning of the fuel. During the melting, the pressure in the furnace atmosphere may be such as to maintain the pressure in the furnace adjacent the tap hole at or slightly above or below the ambient atmospheric pressure. With such a procedure, it is preferred, as indicated earlier, to direct into the tapping spout a reducing flame from a gas torch disposed outside of the furnace adjacent the spout. Where open or partially open launders are employed for delivering the metal to a desired location, such torches preferably are also provided along the top of the launder with their flame directed into the launder to protect the metal from the air as the metal flows through the launder. Preferably, the furnace is fired at a rate which provides sufficient positive pressure in the furnace to cause the furnace gases to flow through and fill the tap hole. In the most preferred procedure, the pressure of the furnace atmosphere is maintained sufficiently high to cause hot gases from the furnace to shoot into and through the tap hole and a portion of the launder so as to fill the tap hole and at least a part of the launder with the furnace gases. With this preferred procedure, the portion of the launder which is filled with the furnace gases is covered. The remaining portion of the launder, if any, is partially covered and is provided with the above mentioned torches to protect such remaining portion from the air.

During the melting of the copper in the furnace, samples of molten copper as it flows through the tap hole may be taken and the reducing conditions in the melting stream injected into the furnace may be changed to change the oxygen contained in the copper to a different desired value as indicated by an analysis of the sample. The reducing condition in the injected melting stream may also be changed to change the set of the copper to a different desired set as indicated by the set of the frozen samples. Thus, for example, where natural gas is employed as the fuel and it is desired to lower the set of a high-set copper (i.e. where the set is convex), the reducing conditions in the melting stream are decreased until the set is lowered to the desired extent. Where it is desired to raise the set of a low set copper (i.e. where the set is concave), such reducing conditions are increased until the desired set is obtained.

The invention is useful in providing molten copper for casting into any shape by any casting procedure. It is particularly useful in connection with casting copper wire bar and tough pitch or deoxidized copper cakes and billets, especially deoxidized, low-phosphorus copper cakes and billets, particularly when continuous casting procedures are used. With such procedures, particularly when they are employed in casting tough pitch or deoxidized copper cakes and billets, especially cakes and billets which are deoxidized with a deoxidizing agent such as phosphorus to combine with the last traces of oxygen combined with the copper, the molten copper from the furnace may be delivered to a holding furnace from which it may be fed through appropriate pouring means to the continuous casting apparatus. The holding furnace functions as a surge tank for the copper and also as a situs for incorporating the deoxidizing agent into the copper. In addition, the temperature of the metal may be raised in the holding furnace since in many continuous casting operations, a metal temperature is often desired which is higher than that which is most conveniently or economically supplied by the melting furnace when the latter is operated in the preferred manner without a pool of molten metal therein.

The invention is especially advantageous in providing a source of molten copper for casting wire bar in conventional closed bottom molds. As is known such molds are provided with one or more elongated mold cavities, each of which is sloped at its ends so that the wire bar cast therein is in the form of an elongated shape which usually is generally square in transverse cross-section and having sloped ends providing a gripping surface for feeding the bars into a rolling mill. In practicing the invention to provide molten copper for casting into wire bar, the melting stream is controlled to provide molten metal which contains less than .05% by weight of oxygen. Preferably, to obtain a level set, the metal issuing from the furnace contains less than .035% and more preferably less than .01%, by weight of oxygen and less than .002%, and preferably less than .001%, sulphur by weight. In providing molten metal for casting the novel level set wire bar referred to earlier herein, the metal issuing from the furnace contains, by weight, less than .0007%, preferably less than .0005%, of each of iron and sulphur and less than .035% oxygen. More preferably in producing such novel wire bar, the metal issuing from the furnace contains less than .01% oxygen by weight and the molten metal is allowed to absorb oxygen from the atmosphere as it is poured into the mold so as to increase its oxygen content to a desired value below .035% oxygen. In addition, it has been found that it is difficult to obtain a level set in the wire bar unless the cast bar contains at least about .01% by weight of oxygen. Also, although the present novel properties are obtained in level set wire bar which is free of sulphur and iron, any improvement obtained is not sufficiently great to warrant the effort and expense required to reduce such constituents to less than a trace.

The invention is further illustrated in the accompanying drawings. It should be understood, however, that the drawings are given for purposes of illustration and that the invention in its broader aspects is not limited thereto.

Figure 1:
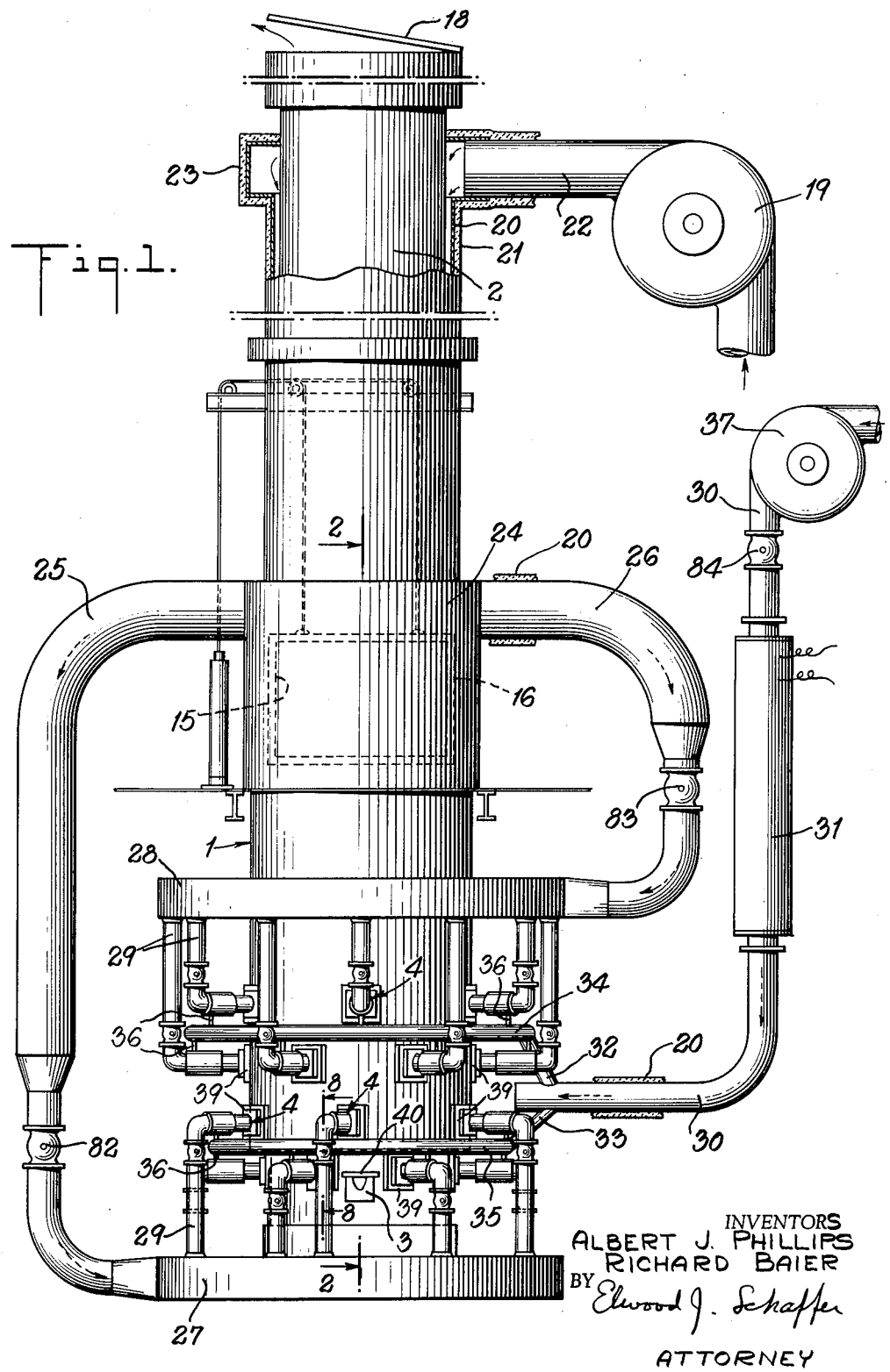
FIG. 1 is an elevational view, partly broken away, illustrating the preferred mode and apparatus for practicing the invention.
Figure 2:
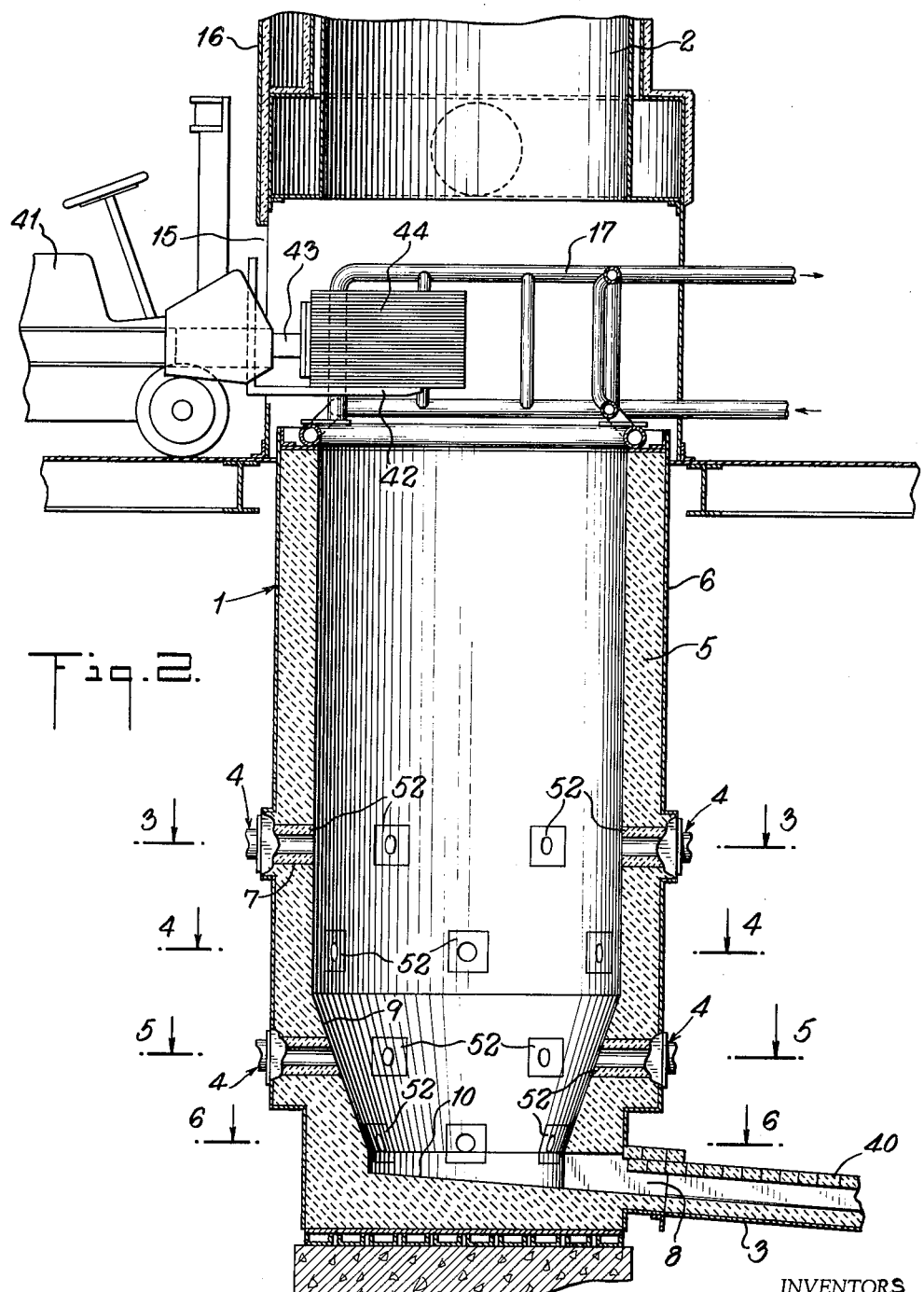
FIG. 2 is a vertical section of the furnace and a portion of the stack shown in FIG. 1, taken along line 2—2 of FIG. 1, with part of the burner assemblies and the piping for supplying the latter omitted for simplicity.
Figure 3:
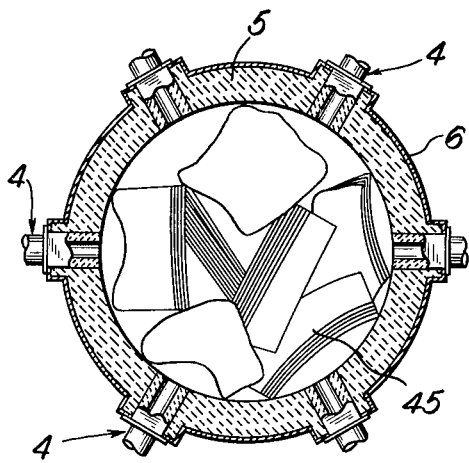
Figure 4:
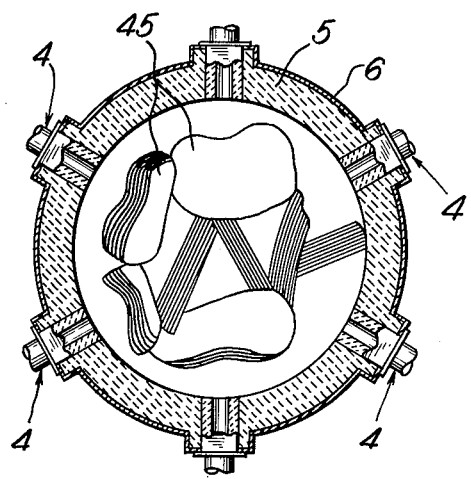
Figure 5:
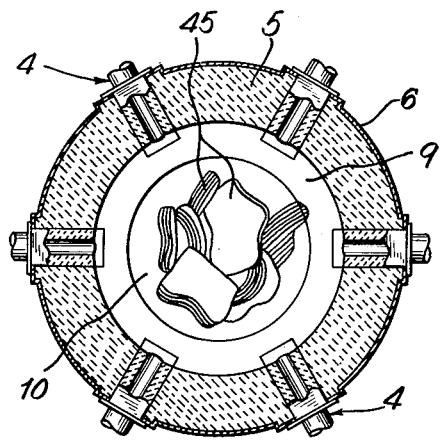
Figure 6:
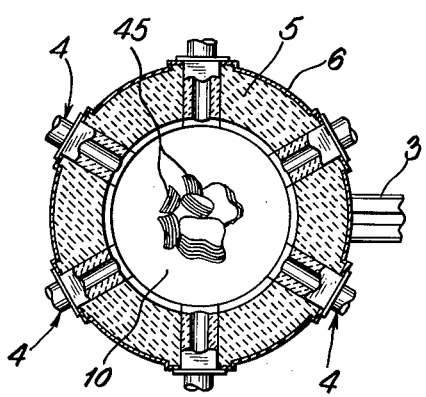
Figure 7:
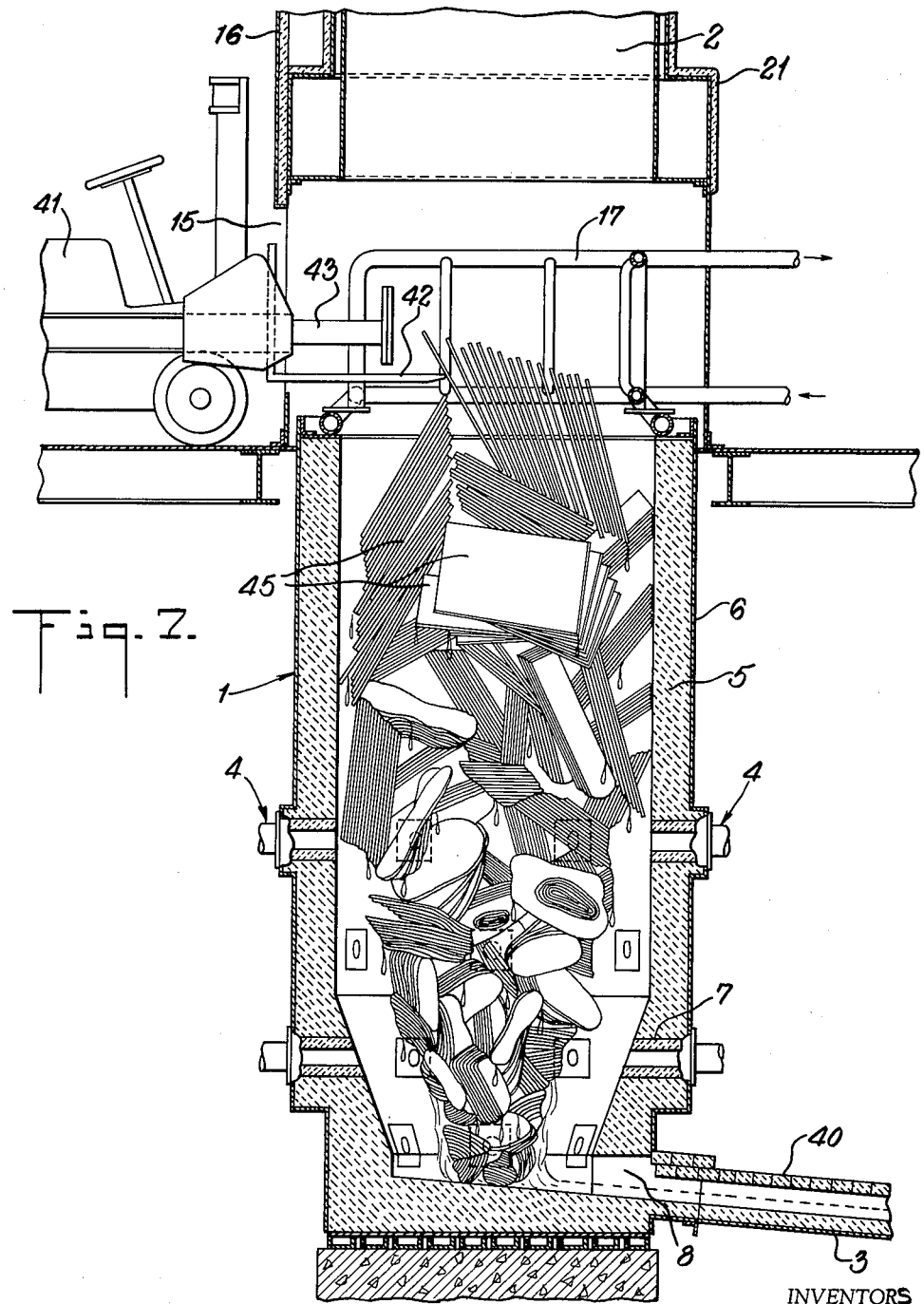
Figure 8:
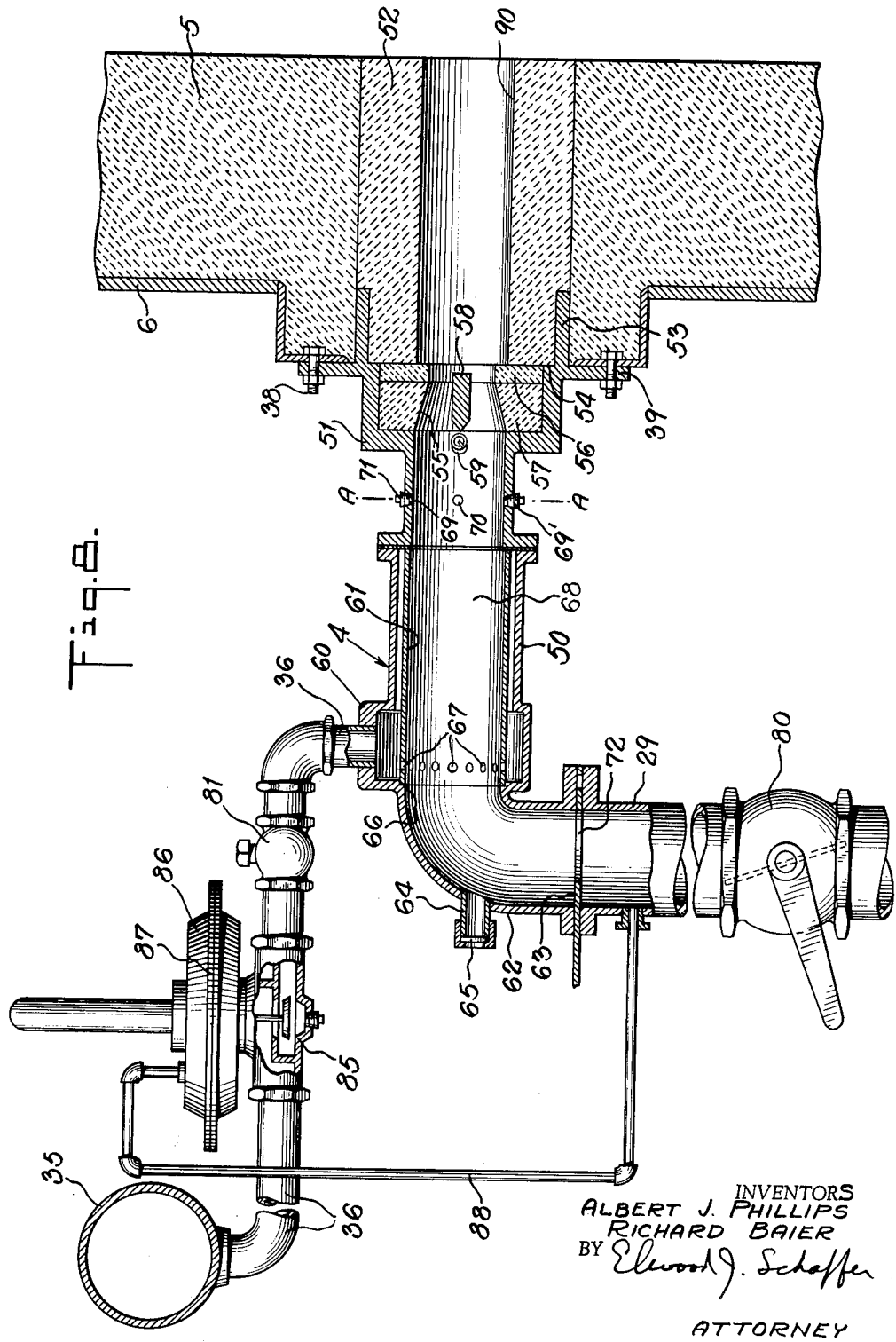
Figure 9:
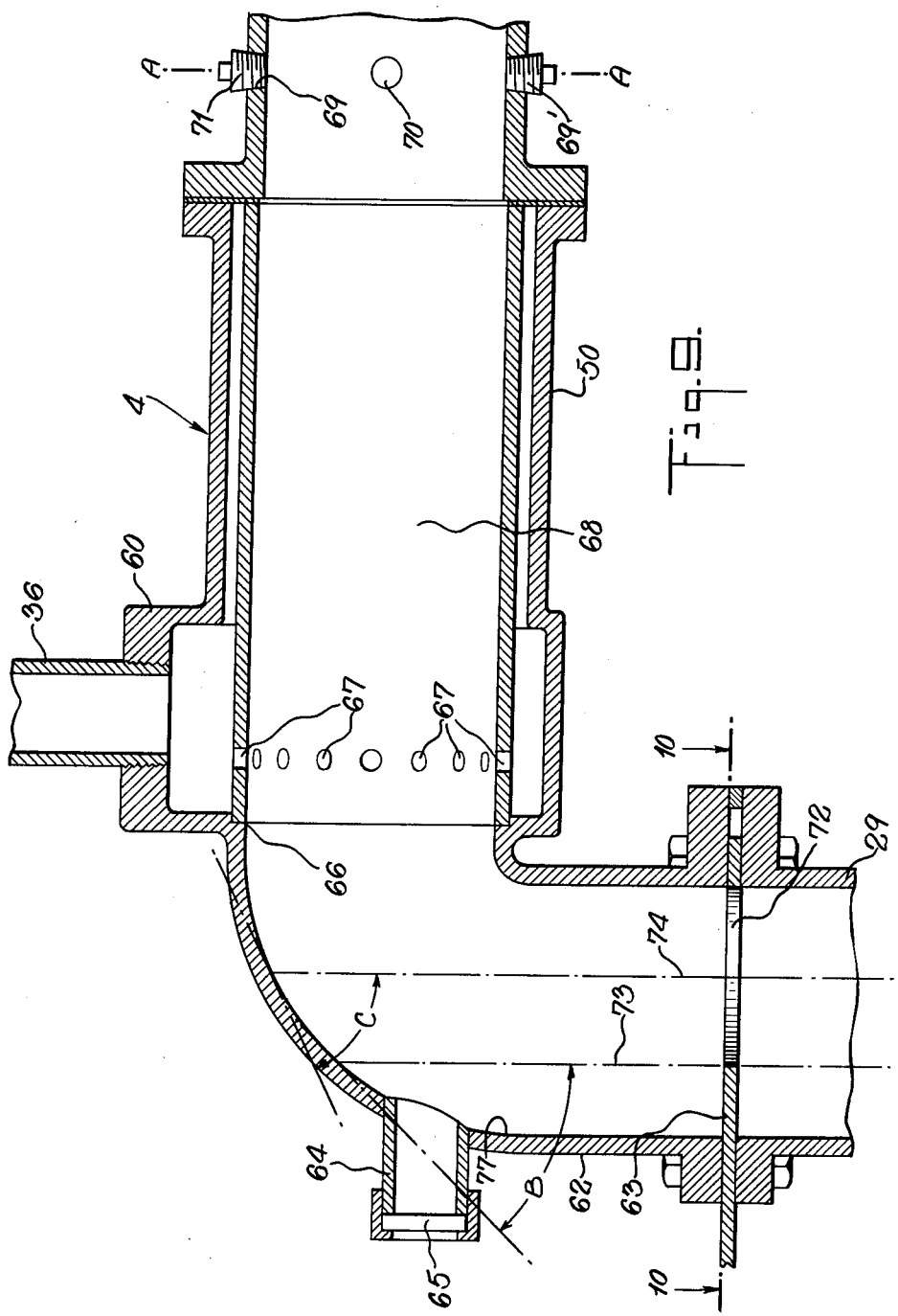

FIGS. 3, 4, 5 and 6 are transverse sections of the furnace taken along lines 3—3, 4—4, 5—5 and 6—6 respectively of FIG. 2, with a charge in the furnace as illustrated in FIG. 7;

FIG. 7 is a diagrammatic view in vertical section of the furnace showing a preferred random disposition of a column of cathodes in elevation in the furnace during the melting procedure;

FIG. 8 is an enlarged vertical sectional view taken along line 8—8 of FIG. 1, showing the burner assembly in greater detail;

FIG. 9 is a vertical section of a portion of a preferred burner body;

FIG. 10 is a horizontal section view taken along line 10—10 of FIG. 9;

FIG. 11 is a perspective view of a wire bar;

FIG. 12 is a longitudinal section of the wire bar taken along line 12—12 of FIG. 11; and FIG. 13 is a transverse section of the wire bar taken along line 13—13 of FIG. 12.

Referring now to the drawings, FIG. 1 shows an assembly comprised of melting furnace 1, stack 2, launder 3 and associated piping for supplying burner bodies 4 with fuel and an oxygen-containing gas. As shown in FIGS. 2 through 7, the furnace 1 is provided in its side walls and bottom with a refractory lining 5 which is surrounded by shell 6 fabricated of an appropriate material, preferably a metal such as steel which has been suitably assembled as by welding to provide a shell which is substantially gas tight. The furnace side walls are provided with a plurality of ports 7 for the burner bodies 4. As shown in FIG. 2 and FIG. 7, the lower side walls 9 of the furnace are sloped inwardly and the furnace bottom 10 is sloped toward tap hole 8 which leads into launder 3.

As shown in FIGS. 1 and 2, the stack 2 is provided with opening 15 for charging copper shapes into the furnace and a door 16 for closing the opening when the furnace is not being charged. The bottom of the stack also contains water-cooled rack 17 fabricated of appropriate pipes supplied with cooling water from a source not shown; the rack serving as a guide for the copper being charged into the furnace. The stack is provided at its top with damper 18 which may be employed to assist in providing a desired pressure in the furnace atmosphere during the melting procedure. The portion of the stack above door 16 also serves as a preheater section and is provided with annular sleeve 20, fabricated of a suitable metal such as steel and lagged on the outside with insulation 21. Air from blower 19 is passed at a desired positive pressure through pipe 22 to manifold 23 from which it passes downwardly between sleeve 20 and the stack 2 into manifold 24 which is also lagged with insulation 21; the air being preheated in its downward passage. The preheated air passes from manifold 24 through lagged pipes 25 and 26 to lagged manifolds 27 and 28 respectively from which it is delivered at a desired positive pressure to the individual burner bodies 4 by lagged pipes 29. The fuel, preferably a gaseous fuel, from a suitable source (not shown) is forced by blower 37 at a desired positive pressure through lagged pipe 30 provided with heater 31, supplied with heat in any suitable manner, as for example with a heat exchangers using either electrical heat or hot products of combustion, for preheating the fuel. The preheated fuel from pipe 30 is passed through lagged pipes 32 and 33 to lagged manifolds 34 and 35 from which it is delivered by lagged pipes 36 under a desired positive pressure to the individual burner bodies 4 which may also be lagged to prevent heat loss.

As shown in FIGS. 1, 2 and 8, a burner body 4 is inserted into each of the side wall ports 7 and held in position therein by bolts 38 which hold the mounting plate 39 of each burner body tightly against shell 6 so as to provide a substantially gas tight mounting. Such mounting together with the closed construction of the burner bodies substantially prevents the introduction of extraneous air into the furnace through the burner ports 7. A plurality of burner bodies are mounted in the furnace wall in this manner in each of a plurality of banks of burners with each burner in each bank in spaced relationship to each other about the furnace perimeter and with each of the banks in spaced vertical relationship to each other with the two lower banks disposed in the sloped wall portion of the furnace; the lowermost bank being disposed adjacent the furnace bottom. As pointed out earlier herein, such an arrangement of the burners in combination with the inwardly sloping furnace wall assists in causing the bottom portion of the melting column to assume a generally conical shape as is illustrated by the shape of the column shown in FIG. 7 and provides a higher melting rate than would otherwise be obtained.

In preparing the furnace for starting, either initially or when the furnace is cold, the launder cover bricks 40 are partially removed and the inside of the launder is heated along its entire length with gas torches until the launder is hot enough to allow the initial molten metal from the furnace to pass therethrough without obstructing the flow due to freezing; such heating being continued at least until the furnace is ready to produce molten metal. The furnace itself is also fired, preferably at a low rate, for about fifteen to thirty minutes to preheat the refractory lining. Sufficient copper is then charged into the furnace to provide therein a column of the shapes to be melted which extends to the top of the furnace and the cover bricks 40 are replaced on the top of the launder 3. Thereafter the furnace is fired at the desired operating rate, the molten copper as it forms running downwardly in the furnace to the sloping floor from which it flows through tap hole 8 into and through launder 3 from which the molten metal may be delivered either directly to suitable casting apparatus (not shown) or to a holding furnace (not shown) from which it may be delivered to casting means. During the melting, copper is charged, preferably intermittently or semi-continuously, as needed, to maintain the top of the column at or near the top of the furnace. Also, the pressure in the furnace atmosphere is maintained sufficiently high to cause the furnace gases to fill the tap hole 8 and at least a portion of launder 3. In stopping the melting, any of the stopping procedures described earlier herein may be employed.

In charging the copper to the furnace, door 16 is opened and small stacks or piles of the copper shapes (see FIG. 2) are inserted through opening 15 by any suitable means, for example, a motor truck 41 provided with a conventional lift means 42, and pushing means 43, and dropped into the furnace in such a manner as to cause the shapes to assume an unaligned random position in the column. After sufficient copper has been charged the door 16 is closed. In charging cathodes to the furnace, small piles 44 of horizontally disposed cathodes may be inserted through opening 15 and may be pushed from lift means 42 by pushing means 43 so as to fall or tumble (see FIG. 7) into the furnace and assume therein a random disposition such as is illustrated by the "jack-straw" disposition of the cathodes 45 in FIGS. 3 through 7.

In controlling the reducing conditions in the melting stream constituted by the plurality of unit streams injected into the furnace from the burners 4, the control of the total oxygen content across the path of the unit streams before they enter the furnace may be accomplished in any desired manner. However, a burner body of the type illustrated in FIGS. 8 through 10 has been found to be especially useful and advantageous in providing such control, particularly where gaseous fuels are employed, and such burner bodies are preferred in practicing the invention. As shown in FIG. 8, the burner body 4 is comprised of a section 50 for uniting a stream of fuel and a stream of an oxygen-containing gas to form a unit stream and for introducing the unit stream into igniter section 51. The burner body is also provided with combustion section 52 fabricated of a suitable refractory material and mounted on annular flange 53 against shoulder 54 of igniter section 51. The igniter section is also provided with an annular refractory ring 56 and annular refractory sleeve 57 which is adapted to form, with ring 56, a throat 55 in section 51. Bar 58 may be disposed in the throat and a conventional electrically activated spark plug 59 for igniting the unit stream may be mounted on the side of section 51 with the inner end of the spark plug disposed adjacent bar 58 as shown. The combination of the throat and bar 58 are especially useful in maintaining combustion of the unit stream in section 52, particularly when the unit stream is moved through the burner body at a high velocity. Section 51 is also provided with openings 69 and 70 for taking samples of the unit stream; such openings being normally closed by plugs 71. Instead of employing ignition means such as spark plugs 59, the unit stream may be ignited from the inside of the furnace, although such a procedure is not preferred. Thus, for example, in starting the furnace a wood fire may be kindled in the furnace. Upon injecting the combustible unit stream into the furnace at a low rate of injection, it will ignite and burn back to the normal ignition point provided by ignition means within the burner, after which the burner may be operated at the intended firing rate.

Section 50 has an annular manifold portion 60, sleeve 61, bend or elbow portion 62, orifice plate 63 and observation port 64 provided with transparent eye piece 65. Sleeve 61, which abuts shoulder 66 and the left end of section 51, cooperates with annular portion 60 to provide a manifold for introducing the smaller of the two streams to be united (usually the fuel stream) from pipe 36 through openings 67 into uniting chamber 68; the size and distribution of openings 67 about the periphery of the sleeve being selected to control entry of the fluid into the chamber. The larger stream (usually the air or oxygen containing gas) is introduced to chamber 68 from pipe 29 through the orifice in plate 63 and bend portion 62.

In operating the burner body, it was found that the total oxygen content of samples of the unit stream taken at different points in plane A—A through openings 69 and 70 were not the same. It was also found that differences in the total oxygen content found in samples of the unit stream taken at the same or different points in plane A—A could be increased or decreased by shifting orifice plate 63 in its plane across the air stream at the inlet end of bend portion 62 (see FIG. 10) so as to change the position of orifice 72 and cause the air to impinge at a different angle upon bend portion 62. However, when orifice plate 63 was relocated to a position at the outlet end of bend portion 62 immediately in front of the left end of sleeve 61 with the plane of the orifice perpendicular to the axis of the sleeve, relatively large differences in total oxygen content in plane A—A in the unit stream were again found but shifting the orifice plate across the path of the larger stream had no appreciable effect on the differences in total oxygen content found in plane A—A of the unit stream. Moreover, it was found that any pattern of variation in total oxygen content found across plane A—A persisted in the unit stream in its passage through the remainder of the burner body 4.

Accordingly, in operating the burner bodies, the larger stream of the two streams to be united is conducted to the burner body through an orifice into a bend leading to the uniting chamber, the larger stream is impinged upon a curved surface in the bend to deflect the stream into the uniting chamber and the position of the orifice is shifted to change the angle of impingement of the stream upon the curved surface so as to control variations in the total oxygen content across the path of the unit stream ejected from the burner. It has been found that least variation in such total oxygen content is obtained when substantially all of the larger stream passing through orifice 72 impinges on the curved surface of elbow 62 so that the smallest angle, between the path of flow of said stream and any tangent to that portion of the curved surface upon which the stream impinges, is greater than 45 degrees; and in which the smallest angle with any tangent to that portion of the curved surface upon which a major portion of the stream impinges, is greater than 65 degrees. Thus, as illustrated in FIG. 9, line 73 which is drawn from the left side of orifice 72 parallel to the longitudinal axis 74 of the inlet portion of elbow 62 represents the left side of the path of flow of the larger stream. As shown, the angle between line 73 and the tangent to the curved surface when the latter is intersected by line 73 is greater than 45 degrees (illustrated by the angle B) and the angle C between the orifice axis 74 and the tangent to the curved surface where the latter is intersected by orifice axis 74 is greater than 65 degrees. In addition, it was found that the distance of the fuel inlet openings 67 from the orifice plate 63 affects the sensitivity of the control afforded by shifting the orifice plate 63 in that, as such distance is increased, the sensitivity to shifts in the orifice plate is decreased. Preferably, all of the openings 67 are located within about a foot of the orifice plate as measured along the line 77 generated by the largest internal radius of the elbow and more preferably, as close as practicable thereto.

As shown in FIG. 8, each of the pipes 29 for conducting the larger stream (air) to the burner bodies 4 is provided with a valve 80 for controlling the amount of air delivered at positive pressure to the burner body.

Likewise, each of the pipes 36 for conducting the smaller stream (fuel) to the burner bodies is provided with a valve 81 for controlling the amount of fuel delivered at positive pressure to the burner body. In addition, as shown in FIG. 1, air pipes 25 and 26 may have valves 82 and 83 respectively for shutting off the air supply and main fuel pipe 30 may also be provided with valve 84 for shutting off the fuel. Also, as shown in FIG. 8 each of the pipes 36 may be provided with a conventional diaphragm controlled valve 85 controlled by a conventional diaphragm means 86 which is provided with diaphragm 87. Each of the diaphragm means is also provided with tube 88 leading from inside pipe 29 to the space above the diaphragm in the diaphragm means so as to communicate the pressure of the air in pipe 29 to the diaphragm. Such an arrangement employing a positive pressure in the fuel and air delivered to uniting chamber 68 is preferred since, by its use, the fuel in pipe 36 ahead of valve 81 is maintained at the same pressure as the air in pipe 29 ahead of orifice plate 63 whereby the ratio of the fuel to the air delivered to the burner, especially when the firing rate of the burner is changed, is more readily controlled to a desired value than the control afforded by an arrangement in which the smaller steam is introduced into chamber 68 by inspiration. Thus, for example, to increase the firing rate of the furnace, the pressure of the air in pipe 29 upstream of orifice 63 is increased by opening valve 80. The diaphragm means 86 automatically provides the same pressure in line 36 upstream of valve 81 so that the same ratio of fuel to the air is maintained in the unit stream without changing the setting of valve 81.

*Example 1*

A furnace of the type illustrated in FIGS. 1 and 2 was constructed. It was lined with conventional aluminum silicate fire brick. The inside height of the lined furnace was 6½ feet and the inside diameter thereof above the sloped walls was 6 feet. At the bottom the inside diameter was 3 feet 9 inches and the slope of the walls terminates 3 feet from the furnace bottom, measured along the longitudinal axis of the furnace. The bottom of the furnace was sloped to allow the molten copper to flow from the furnace without collecting as a pool therein. Neither the fuel nor the oxygen containing gas were preheated.

Nine burners of the type illustrated in FIG. 8 were employed and each was provided with diaphragm means 86. The outside of section 52 of the burners was square and was 9 inches on its sides. Inside wall 90 of section 52 of the burners was round and was 5¼ inches in diameter. Each burner was provided with an electrically actuated spark plug 59 to ignite the unit stream. Each burner was also provided with a combustion bar 58 to assist in maintaining combustion of the unit stream in section 52. The distance from shoulder 66 to the point on the left end of bar 58 was 12 inches. The burners were disposed in three banks. The bottom bank contained three burners evenly spaced about the furnace perimeter with the bottom of the burners disposed approximately 8 inches above the furnace bottom. The next bank thereabove also contained three burners spaced evenly about th furnace perimeter with the burners disposed midway between the burners in the bank therebelow and with the center of the burners 12 inches above the center of burners in the bottom bank. The third burner bank likewise contained three burners spaced evenly about the furnace perimeter with the burners disposed midway between the burners therebelow in the second bank and with the center of the burners 24 inches above the center of the burners in the second bank.

The fuel employed was natural gas having a heating value of 1030 B.t.u. per cubic foot and the oxygen containing gas was air. Analysis of the natural gas showed its composition to be equivalent to $CH_{3.86}$ and that the gas contained less than .002 pound of sulphur per million B.t.u. The ratio of the natural gas to the air delivered to the furnace was such as to provide a melting stream containing 18.85% oxygen, by volume, on the dry basis. The furnace was fired at a low rate for about 30 minutes to heat the refractory. A column of copper cathodes was placed in the furnace and, during the melting, cathodes were charged intermittently as needed to maintain the top of the column adjacent the top of the furnace. After the furnace was preheated in this manner and the column of cathodes was charged into the furnace, the burners were fired at their operating capacity during the melting operation. The pressure in air pipes 29 ahead of orifice plate 63 and the pressure in fuel pipes 36 ahead of valve 81 was 41 inches of water (gauge). The pressure in section 51 of the burners measured in opening 69 was 18 inches of water (gauge); such pressure corresponding to a velocity of 250 feet per second in the hot products injected into the furnace at a temperature of 2600° F. The pressure inside the furnace at the tap hole was 0.6 inch of water (gauge).

The bottom six burners taken as a whole were fired at a rate to provide 4,000 B.t.u. per minute per cubic foot in the lowermost three feet of the furnace, on an empty furnace basis. The total heat provided to the furnace from the nine burners was 340,000 B.t.u. per minute.

Within five minutes after commencing to fire the burners at their operating capacity, molten copper began to flow from the tap hole 8 and within a half hour after beginning such firing, the furnace was delivering molten copper at an average rate of 12 tons per hour during the run. The temperature of the molten metal flowing from the tap hole was approximately 2070° F. Samples of the atmosphere inside the furnace were taken at intervals during the run at the bottom of the furnace at a point which was one foot inside the tap hole and at a point inside the furnace about 12 inches from the top of the furnace. Analyses of these samples showed that the furnace atmosphere contained 2.07% hydrogen by volume on the dry basis during the run. Samples of molten metal leaving the furnace were taken at the tap hole during the run and were found to contain more than .05% and as much as .069% oxygen by weight.

*Example 2*

The procedure outlined above was repeated and the same results were obtained. During the repeated run, samples of the melting stream were bled from each of the burners; the samples from half of the burners being bled from the top through orifice 69 and the samples from the other half being bled from orifice 69′ (see FIG. 8) at the bottom of the burners.

The samples were found to contain different amounts of oxygen, from as little as 18.58% to as much as 19.02% by volume, on the dry basis. The ratio of the fuel to the air delivered to the individual burners was then adjusted by changing the setting in valve 81 so that the samples of gas bled from each of the burners contained 18.80% oxygen, by volume, on the dry basis. It was found in operating the furnace after such adjustment was made that the overall rate of delivery of the natural gas and air to the furnace remained essentially unchanged and that the hydrogen content of the furnace atmosphere at the top and bottom of the furnace also remained essentially unchanged at 2.17% hydrogen, by volume, on the dry basis. It was found however, that the oxygen content of the molten copper increased to .083%.

Samples of gas were then taken at various points in the plane A—A (see FIG. 8) in each of the burners. Such samples were taken through a sampling tube inserted through orifices 69 and 70 in burner section 51.

The sampling tube was a hollow round tube closed at the end which was inserted into section 51 and was provided with a 1/16 inch orifice on its side wall adjacent the closed end of the tube. In taking the samples said orifice in the sampling tube was faced directly upstream into the moving stream in section 51. In each burner, samples were taken at three or more evenly spaced points across plane A—A through each of the orifices 69 and 70. Analysis of the samples showed a wide variation in their total oxygen content. The lowest total oxygen content found in any of the samples was 18.62% total oxygen content, by volume, on the dry basis, and the highest total oxygen content found was 19.6% total oxygen, by volume, on such basis, thereby providing a spread of more than 0.6 between the highest total oxygen content found and the intended total oxygen content of 18.80%, by volume, on the dry basis, for the melting stream.

The orifice plate 63 in each of the burners was then shifted across the path of the air stream to adjust the position of orifice 72 to a position in which the difference between the highest and lowest total oxygen content found in plane A—A in each of the burners was less than 0.1% total oxygen, by volume, on the dry basis. Thereafter, where needed valve 81 was adjusted on the burners to provide 18.80% oxygen, by volume, on the dry basis, in the unit stream in each of the burners. In operating the furnace after these adjustments were made, it was found that the overall rate of delivery of the natural gas and air to the furnace in the melting stream remained essentially unchanged and that the hydrogen content of the furnace atmosphere at the top and bottom of the furnace remained essentially unchanged at 2.04% hydrogen, by volume, on the dry basis. However, it was found that the oxygen contained in the molten metal had been reduced and that the molten metal contained .0079% oxygen by weight. It was also found that the copper contained less than .0007% of sulphur and less than .001% iron by weight and that no slag was formed during the melting of the copper in this manner.

*Example 3*

A small rectangular furnace provided with a single burner was constructed. The side walls and the bottom of the furnace were lined with conventional aluminum silicate fire brick and were surrounded by a steel shell. The lined furnace on its inside was 14 inches wide, 27 inches long and 17 inches high and was open at its top. A single burner assembly of the type illustrated in FIG. 8 was employed. The inside wall 90 to section 52 was round and was 3¾ inches in diameter. The distance from shoulder 66 to the point on the left end of bar 53 was 26 inches. The burner was disposed at the bottom of one end of the furnace with its center midway between the sides and 5½ inches from the furnace bottom. A tap hole, one inch in diameter was located on one of the side walls at the bottom of the furnace six inches from the inside surface of the end wall containing the burner. The furnace bottom was slightly sloped toward the tap hole. During the melting of copper in the furnace, the furnace top was partially covered to maintain a positive pressure in the furnace which was sufficient to cause hot gases from the furnace to shoot into and through the tap hole and to a distance 12 inches therefrom.

With the furnace empty, the burner body was adjusted while firing at full capacity employing natural gas as the fuel and air as the oxygen containing gas. Samples of the melting stream taken across plane A—A through orifices 69 and 70 in section 51 showed a difference in total oxygen content of less than .01 between the highest total oxygen content and the lowest total oxygen content found in the samples taken in the plane.

Thereafter the furnace was fired at a low rate and a portion of a copper cathode (the portion being 12 inches wide, 14 inches long and approximately ¾ inch thick) was placed upright in the furnace in front of the burner, twelve inches inside the furnace from the furnace end wall in which the burner was disposed. The burner was then turned to full fire, unpreheated natural gas and air being delivered to the burner so as to provide a melting stream containing 18.80% total oxygen content, by volume, on a dry basis. Under the full firing conditions 1700 cubic feet of natural gas per hour were delivered to the furnace. Molten copper commenced to flow through the tap hole in less than five minutes after the burner was turned to full fire and the test was thereafter continued until all of the cathode portion was melted. Samples of the molten copper issuing from the tap hole were taken during the test. Analyses of the samples showed an oxygen content in the copper of less than .01% by weight.

The foregoing test was repeated but in this instance a cathode portion was placed in front of the burner in an upright position in the furnace six inches from the furnace wall which contained the burner. Analyses of the molten copper produced during the test showed that it contained .039% oxygen by weight.

The foregoing test was again repeated with a cathode portion placed in the vertically upright position in the furnace twelve inches from said end wall but in this instance the ratio of unpreheated natural gas to the air delivered to the burner was such as to provide a melting stream containing 18.6% total oxygen content, by volume, on a dry basis. Analyses of the molten copper produced during the test showed that it contained .035% oxygen by weight.

*Example 4*

The procedure described in Example 3 was repeated in a series of tests using the different ratios of natural gas to air in forming the melting stream which are set forth in the table below. The cathode portions in each test were placed at the 12 inch position except in test #6 where the cathode portion was placed inside the furnace in an upright position in front of the burner and 9 inches from the furnace wall in which the burner was disposed. In each test a sample of gas was taken 6 inches inside the furnace in the longitudinal axis of the burner. Such gas samples were analyzed for unburned oxygen and the degree of combustion of the oxygen introduced into the melting stream by the air was determined. Samples of the molten copper produced in each test were also taken and analyzed for oxygen content. The results are given in the following table in which the analyses for oxygen in the gaseous sample and the hydrogen in the furnace atmosphere are given in percent, by volume, on the dry basis.

|  | Test 1 | Test 2 | Test 3 | Test 4 | Test 5 | Test 6 |
|---|---|---|---|---|---|---|
| Percent O₂ in melting stream before ignition | 18.90 | 18.78 | 18.67 | 18.62 | 18.61 | 18.55 |
| Percent unburned O₂ in stream at 6 inches | 1.70 | 2.16 | 5.59 | 4.38 | 5.24 | 13.4 |
| Degree of oxygen combustion at 6 inches, percent | 91 | 88½ | 70 | 76½ | 72 | 27½ |
| Oxygen in copper, percent by weight | .01 | .005 | .015 | 0.29 | .035 | .047 |
| Furnace atmosphere, percent hydrogen | 1.0 | 2.55 | 4.00 | 4.80 | 5.00 | 5.65 |

In this example and for the purposes of this specification and the claims, the degree of oxygen combustion in the melting stream by the time the latter has traveled about six inches into the furnace is found by determining the percentage, by volume, on a dry basis, of unburned oxygen in a sample of the melting stream taken in the stream about six inches inside the furnace; such percentage of such unburned oxygen is then divided by the percentage, by volume, on the dry basis, of the oxygen initially present in the melting stream before the latter has been ignited; the quotient from such division is then subtracted from the number one (1) and the difference is multiplied by 100 to obtain the degree of oxygen combustion at said six inch point.

*Example 5*

A round furnace of the type described in Example 1 was constructed using burners of the size described in Example 3. The furnace was lined with conventional aluminum silicate fire brick. In its inside dimensions, the lined furnace was five feet high and five feet in diameter above the sloped walls. The inside diameter of the furnace at its bottom was three feet six inches. The slope of the wall terminated two feet from the furnace bottom as measured along the longitudinal axis of the furnace. Four burners were disposed on the furnace wall equidistantly about the furnace perimeter with the center of the burners five and one-half inches above the highest point of the sloped furnace bottom.

Unpreheated propane having a heating value of 2600 B.t.u. per cubic foot was employed as the fuel in operating the furnace and unpreheated air was used as the oxygen containing gas. The ratio of the propane to the air delivered to the furnace during the melting was such as to provide a melting stream which before ignition contained 19.90% total oxygen content, by volume, on the dry basis. Prior to melting copper in the furnace, the orifice plate 63 in each of the burners was shifted until the highest total oxygen content found in the plane A—A of all of the burners was less than 19.95% oxygen, by volume, on the dry basis.

The furnace was fired at a low rate for about twenty minutes to heat the refractory. Copper cathodes were then charged to the furnace so as to be disposed therein at an angle of about sixty degrees to the horizontal and the burners were fired at a rate to supply heat to the lowermost three foot portion of the furnace at a rate of 2000 B.t.u. per minute per cubic foot. During the melting, cathodes were charged as needed to keep the level of the cathodes above the top of the furnace. It was found that copper was melted at the rate of four tons per hour. Samples of the molten copper issuing from the furnace were taken in graphite sampling molds. Analyses of the samples showed their oxygen content to be elss than .005% oxygen by weight.

*Example 6*

The furnace illustrated in FIGS. 1 through 10 in the drawings was constructed using eighteen burners of the size set forth in Example 1. The furnace was lined with conventional aluminum silicate fire brick. In its inside dimensions the lined furnace was 14 feet from the furnace bottom to the bottom of rack 17 and six feet in diameter above the sloped walls. The inside diameter of the furnace at its bottom was three feet nine inches. The slope of the walls terminated three feet nine inches from the furnace bottom, as measured along the longitudinal axis of the furnace. Four banks of burners were disposed on the furnace walls with the burners in each bank spaced equidistantly about the furnace perimeter; each of the two lower banks containing six burners and each of the two upper banks containing three burners. The center line of the burners in the bottom bank was seven inches above the highest point of the sloped bottom of the furnace. The distance between the center line of the first burner bank and that of the second was twenty inches. The distance between the center line of the second burner bank and that of the third was twenty-four inches. The distance between the center line of the third and fourth burner bank was also twenty-four inches.

In operating the furnace natural gas was used as the fuel and air as the oxygen containing gas. The natural gas contained less than .01 pound of sulphur per million B.t.u. and had a heating value of 1070 B.t.u. per cubic foot. The air was preheated to about 300° F. by stack 2 and the natural gas likewise was preheated to 300° F. in preheater 31. The ratio of the natural gas to the air delivered to the furnace during melting was such as to provide a melting stream which before ignition contained 18.82% total oxygen content, by volume, on the dry basis. Prior to melting copper in the furnace orifice plate 63 in each of the burners was shifted until the highest total oxygen content found in the unit stream in plane A—A of each of the burners was less than 18.90% total oxygen content, by volume, on the dry basis.

The furnace was charged with copper cathodes to provide a column of copper therein extending to its top. The burners were then fired at a low rate for about one-half hour to heat the refractory and thereafter the burners were fired at their operating rate. At the operating rate, heat was supplied to the furnace at the rate of 1,100,000 B.t.u. per minute and heat was delivered into the lowermost three foot portion of the furnace from the first bank of burners at a rate of 15,000 B.t.u. per minute per cubic foot of the three foot portion. Under these firing conditions the furnace atmosphere contained 2% hydrogen by volume on the dry basis and the pressure in the furnace at its bottom was sufficient to cause the furnace gases to shoot through the tap hole 8 and into covered launder 3 for a distance of fifteen feet. The furnace reached its full melting rate within fifteen minutes after the burners were fired at the above operating rate.

As the initially charged column of cathodes was melted, cathodes were charged to the furnace to provide the random disposition of the cathodes in the column which is illustrated in FIGS. 3 through 7. The melting rate with such random disposition was about 45 tons per hour. Samples of the molten copper taken during such melting were found to contain, by weight, less than .005% oxygen, less than .0005% each of iron and sulphur.

Thereafter, while continuing to operate the furnace at the above described operating conditions, the method of charging the cathodes to the furnace was changed so as to cause the cathodes to be disposed in the column in a generally horizontal position. It was found that, with such charging, the melting rate decreased to a rate as low as thirty tons per hour and that the oxygen, iron and sulphur in the molten copper remained essentially unchanged.

Random charging of the cathodes was again employed but reject copper wire bars containing more than .03% oxygen by weight were charged uniformly with the cathodes at a rate amounting to 15% by weight of the total charge. It was found that the oxygen, iron and sulphur in the copper remained essentially unchanged and that the melting rate was about forty-five tons per hour. The furnace was operated on a daily basis in this manner over a period of several months to supply molten copper for casting as needed in the plant in which the furnace was installed. During this period, the needs of the plant were readily satisfied by operating the furnace continuously for 6 to 12 hours a day. At the end of an operating day, the furnace was stopped by discontinuing the metal charging and the delivery of fuel to the furnace while continuing to deliver air thereto until the flow of metal stopped, after which the air was also turned off. On the next operating day, the furnace was restarted by firing at a low firing rate until the furnace refractory was heated at least to a red heat, after which regular firing and metal charging was commenced. In operating in this manner over such period, it was found that the melting rate and the oxygen, iron and sulphur in the molten copper remained essentially unchanged; and at no time was it necessary to stop the furnace due to plugging of the tap hole with frozen metal.

*Example 7*

The molten copper produced in Example 6 was delivered by launder 3 to a ladle of a conventional wire bar casting wheel and was cast into conventional 250 pound wire bars, illustrated by the numeral 95 in FIGS. 11 through 13. During such conventional casting the molten copper absorbed sufficient oxygen from the atmosphere to increase the oxygen content of the copper to a value in the range .015 to .03% oxygen by weight. The cast wire bar had the level set illustrated by the surface 96 (see FIG. 13). Samples of the thus cast wire bar were taken from the center of the bar. Analyses of the samples showed the copper to contain, by weight, .015 to .03% oxygen, and from a trace to .0005% each of iron and sulphur. The wire bar may be fabricated into rod of novel properties from which fine wire may be readily drawn.

*Example 8*

The procedure and the furnace described in Example 3 was repeated using kerosene as the fuel and air as the the oxygen containing gas. In the burner employed in the furnace, the uniting chamber was heated and the kerosene was injected into the heated chamber as an atomized stream where it was united with air and the thus heated united stream was passed into the immediately adjacent combustion chamber from which it was injected into the furnace. The cathode portion was placed twelve inches from the furnace wall which contained the burner. The furnace atmosphere was found to contain 2.64% hydrogen, by volume, on the dry basis. The degree of oxygen combustion by the time the melting stream had traveled six inches into the furnace from the furnace wall was more than 99%. No difference in total oxygen content across the path of the stream as the latter emerged from the burner was observed. The molten copper issuing from the furnace was found to contain .002% oxygen by weight.

In the foregoing examples, the sulphur in the copper was determined by the procedure entitled "Sulphur by the Direct Combustion—Iodate Method" given on page 382 of the book entitled "1960 Book of ASTM Method for Chemical Analysis of Metals," published in April 1961 by the American Society for Testing Materials, 1916 Ract Street, Philadelphia, Pennsylvania, employing a three gram sample. The oxygen in the copper was determined by the procedure set forth in the bulletin entitled "Instruction Manual for the Operation of Leco Oxygen Analyzer No. 534–300" published in April 1958 by Laboratory Equipment Corporation, St. Joseph, Michigan, using a plate current of 350 to 400 milliamperes.

The iron in the copper in the foregoing examples was determined by an emission spectographic procedure in which rods of the copper which were 3½ inches long and 5/16 inch in diameter were employed as the positive and negative electrodes; the rods having first been pickled for five seconds in concentrated nitric acid and washed with distilled water and then wrapped in filter paper until placed into the spectograph. The electrodes were excited with direct current arc excitation using 10 amperes and 250 volts. Prior to recording the spectrum the electrodes were excited until a molten meniscus of copper was formed on the lower electrode. Thereafter the electrode gap was adjusted to 5 millimeters and the spectrum recorded for one minute. The iron in the copper was then determined by comparison with a known standard.

The analysis of the gases for oxygen in the examples was made by the procedure described in an article entitled "An Instrument for Determining the Partial Pressure of Oxygen in a Gas," by Pauling et al., J.A.C.S. (1946) Vol. 68, pages 795–798 using an instrument designated as "Model F3 Oxygen Analyzer" manufactured by Beckman Instruments, Inc., Fullerton, California and which is described in the latter's bulletin "1040–A" entitled "Model F3 Oxygen Analyzer" published in October 1958. Gas samples containing less than about 10% by volume of oxygen on the dry basis were also analyzed with a mass spectograph. In addition, the oxygen in the samples of the unburned melting stream may be determined by an indirect procedure in which the sample involved is first burned until the oxygen therein is consumed. Thereafter the products of combustion may be analyzed for hydrogen. The oxygen in the taken sample may then be determined by comparing the results of such hydrogen analysis with known values for the fuel and oxygen containing gas employed, which are derived from normal operating experience.

By continuous melting, as used herein in the specification and in the claims, we mean literally continuous melting, as well as intermittent melting as distinguished from batch melting.

While certain novel features of the invention have been disclosed herein and are pointed out in the annexed claims, it will be understood that various omissions, substitutions and changes may be made by those skilled in the art without departing from the spirit of the invention.

What is claimed is:

1. In a method for producing molten copper having a desired oxygen content in which copper is passed downwardly in a vertical furnace through a reducing atmosphere maintained in the furnace by passing hot products of combustion upwardly through the furnace, the improvement which comprises passing molten copper downwardly through said furnace while injecting into the furnace at least one stream for supplying hot products of combustion to the furnace, each of such injected streams consisting essentially of the hot products of combustion obtained by uniting fuel with an oxygen containing gas in amounts to provide insufficient oxygen in the injected stream to completely burn the fuel contained therein, maintaining in each injected stream the difference between the average total oxygen content intended for the stream and the highest total oxygen content found in at least a preponderant proportion of the area of a plane perpendicular to the path of the stream at a value below a selected value prior to injecting the stream into the furnace, said selected value being less than 4.21 total oxygen, igniting each injected stream prior to injecting it into the furnace, and controlling the combustion of the oxygen in each injected stream to provide at least a minor degree of combustion of the oxygen in the injected stream before the latter has travelled into the furnace more than about six inches from the furnace wall.

2. A method of melting a column of copper shapes in a vertical furnace in a reducing atmosphere by contact of the column with hot products of combustion which comprises injecting into the furnace a melting stream consisting essentially of the hot products obtained by uniting a fluid hydrocarbon fuel with an oxygen containing gas in amounts to provide insufficient oxygen in the melting stream to completely burn the fuel, maintaining the difference between the average total oxygen content intended for the melting stream and the highest total oxygen content found in at least a preponderant proportion of the area of a plane perpendicular to the path of the melting stream at a selected value below 2.11 total oxygen prior to injecting the melting stream into the furnace, igniting the melting stream prior to injecting it into the furnace, controlling the combustion of the oxygen in the melting stream to provide a degree of combustion of at least 35% of the oxygen in the melting stream before the latter has travelled into the furnace more than about six inches from the furnace wall, and tapping the molten metal from the furnace.

3. In a method of melting a column of copper shapes in a vertical furnace in a reducing atmosphere by direct contact of the column with hot products of combustion to produce molten copper containing less than .05% by weight of oxygen, the improvement which comprises injecting into the furnace and impinging on said shapes a melting stream obtained by uniting a fuel and an oxygen containing gas in amounts insufficient to completely burn the fuel; igniting the melting stream prior to its contact with said column; and, prior to injecting the melting stream into the furnace, maintaining the difference between the average total oxygen content intended for the melting stream and the highest total oxygen content found in at least a preponderant proportion of the area of a plane perpendicular to the path of the melting stream at a selected value which is less than the value "K" in the equation:

$$K = \frac{.0632A}{B+.01A}$$

wherein "A" is the percent by volume of oxygen contained in said oxygen containing gas and "B" is the stoichiometrical amount of oxygen, in volumes of oxygen at 68° F. and atmospheric pressure, which is required to completely burn one volume of said fuel, considered as a gas at 68° F. and atmospheric pressure.

4. A method according to claim 3 in which the molten copper produced by melting said copper shapes contains less than .002% sulphur by weight and said fuel is a gaseous hydrocarbon fuel containing less than .04 pound of sulphur per million B.t.u.

5. A method according to claim 4 in which the oxygen containing gas employed to form the melting stream is air and the ratio of the gaseous hydrocarbon fuel to the air delivered to the furnace is such as to provide in the melting stream prior to ignition an oxygen content which is insufficient to completely burn the fuel but which oxygen content is not less than 0.6% oxygen, by volume on the dry basis, below the theoretical amount of oxygen required to completely burn the fuel.

6. A method of melting copper shapes comprising copper cathodes in a vertical furnace in a reducing atmosphere by direct contact of the column with hot products of combustion to produce molten copper containing less than .035% by weight of oxygen which comprises injecting into the furnace and impinging on said shapes a melting stream obtained by uniting a fluid fuel and an oxygen containing gas in amounts insufficient to completely burn the fuel; prior to injecting the melting stream into the furnace, igniting the said stream and maintaining the difference between the average total oxygen content intended for the melting stream and the highest total oxygen content found in at least a preponderant proportion of the area of a plane perpendicular to the path of the melting stream at a selected value which is less than two-thirds of the value "K" in the equation:

$$K = \frac{.0632A}{B+.01A}$$

wherein "A" is the percent by volume of oxygen contained in said oxygen containing gas and "B" is the stoichiometrical amount of oxygen, in volumes of oxygen at 68° F. and atmospheric pressure, which is required to completely burn one volume of said fuel, considered as a gas at 68° F. and atmospheric pressure; controlling the degree of combustion of the oxygen in the melting stream prior to its injection into the furnace to provide at least a major degree of oxygen combustion in a preponderant proportion of the melting stream before the latter has travelled into the furnace more than about six inches from the furnace wall; and tapping the molten metal from the furnace.

7. A method according to claim 6 in which said molten copper contains less than .01% oxygen by weight, said melting stream is injected into the furnace from a plurality of burners disposed on the furnace walls, and the degree of combustion of the oxygen in the melting stream prior to its injection into the furnace from a preponderant proportion of said burners is controlled to provide a degree of combustion of oxygen of at least 85% in the gases inside the furnace in front of each of said preponderant proportions of burners and about six inches from the furnace wall.

8. In a method of melting a column of copper shapes comprising copper cathodes in a vertical furnace in a reducing atmosphere by direct contact of the column with hot products of combustion to produce molten copper containing less than .05% by weight of oxygen, the improvement which comprises injecting into the furnace and impinging on said shapes a melting stream obtained by uniting natural gas with air in amounts insufficient to completely burn the natural gas; and, prior to injecting the melting stream into the furnace, igniting the said stream and reducing the difference between the average total oxygen content intended for the melting stream and the highest total oxygen content found in at least a preponderant proportion of the area of a plane perpendicular to the path of the melting stream to a selected value which is less than 0.6 total oxygen.

9. A method according to claim 8 in which the ratio of the natural gas to the air in the melting stream is such as to provide an oxygen content in the unignited melting stream in the range of about 18.50% to 18.95% oxygen, by volume, on the dry basis.

10. A method according to claim 9 in which the molten copper contains less than .035% oxygen by weight and less than .001% sulphur by weight, said natural gas contains less than .02 pound of sulphur per million B.t.u., and the oxygen content in said unignited melting stream is in the range of 18.65% to 18.95% oxygen, by volume, on the dry basis.

11. A method of melting a column of copper shapes comprising copper cathodes in a vertical furnace in a reducing atmosphere by direct contact of the column with hot products of combustion to produce molten copper containing less than .05% by weight of oxygen which comprises injecting into the furnace and impinging on said shapes a melting stream obtained by uniting a fluid fuel and an oxygen containing gas in amounts insufficient to burn the fuel completely; prior to injecting the melting stream into the furnace, igniting the same and maintaining the difference between the average total oxygen content intended for the melting stream and the highest total oxygen content found in at least a preponderant proportion of the area of a plane perpendicular to the path of the melting stream at a selected value which is less than the value "K" in the equation:

$$K = \frac{.0632A}{B+.01A}$$

wherein "A" is the percent by volume of oxygen contained in said oxygen containing gas and "B" is the stoichiometrical amount of oxygen, in volumes of oxygen at 68° F. and atmospheric pressure, which is required to completely burn one volume of said fuel, considered as a gas at 68° F. and atmospheric pressure; controlling the degree of combustion of the oxygen in the melting stream prior to its injection into the furnace to provide a degree of oxygen combustion of at least 35% in a preponderant proportion of the melting stream before the latter has travelled into the furnace more than about six inches from the furnace wall; injecting the melting stream into the furnace at a rate to provide heat in the lowermost three foot portion of the furnace in amounts not less than 1500 B.t.u. per minute per cubic foot of such three foot portion; and tapping the molten copper from the furnace.

12. A method according to claim 3 in which said melting stream is united in a plurality of steps to provide a plurality of separately united streams which are injected into the furnace through burners mounted on the furnace wall, each of said separately united streams is formed in a uniting zone immediately adjacent each burner, a stream of fuel for each of said separately united streams is fed into each of the uniting zones about the periphery thereof at the end of the zone which is away from the burner, a stream of an oxygen containing gas is passed to each of the uniting zones in a path which is angularly disposed to the axis of the uniting zone and is deflected into the uniting zone by impinging upon a curved surface adjacent the uniting zone and the angle of impingement on the curve surface is adjusted to reduce the differences in total oxygen content in each of the separately united streams to said selected value.

13. A method according to claim 12 in which substantially all of the stream of said oxygen containing gas in each of said angular paths impinges upon the curved surface at an angle to any tangent to the curved surface which is greater than 45° to the curved surface and a major proportion of the stream impinges on the curved surface at an angle with any tangent thereto which is greater than 65°.

14. In a method of melting a column of copper shapes in a vertical furnace in which the column descends in the furnace as a consequence of copper being melted from the column by heat produced by a melting stream injected into the bottom portion of the furnace, the improvement which comprises injecting into the bottom portion of the furnace and impinging on said shapes a melting stream obtained by uniting a fuel with an oxygen containing gas in amounts to provide insufficient oxygen in the melting stream to completely burn the fuel; prior to injecting the melting stream into the furnace, igniting the same and maintaining the difference between the average total oxygen content intended for the melting stream and the highest total oxygen content found in at least a preponderant proportion of the area of a plane perpendicular to the path of the melting stream to a selected value which is less than 4.21 total oxygen; injecting the melting stream into the furnace at a rate to provide heat in the lowermost three foot portion of the furnace in amounts not less than 1500 B.t.u. per minute per cubic foot of such three foot portion; and tapping the molten copper from the furnace.

15. A method according to claim 14 in which said fuel is a fluid hydrocarbon fuel, said oxygen containing gas is air, and the difference between the average total oxygen content intended for the melting stream and the highest total oxygen content found in at least a preponderant proportion of the area of a plane perpendicular to the path of the melting stream is reduced to a selected value which is less than 0.6 total oxygen.

16. A method according to claim 15 in which said copper shapes comprise copper cathodes, said vertical furnace is provided with a transverse cross sectional area which is smaller in the bottom portion of the furnace than the transverse cross sectional area of furnace thereabove, said melting stream is injected into the furnace from a plurality of burners disposed about the furnace side walls in each of a plurality of banks with each burner in each bank in spaced relationship to each other about the furnace perimeter and each bank in spaced vertical relationship to each other bank with the lowermost bank adjacent the furnace bottom, hot products of combustion are injected into the lowermost three foot portion of the furnace at a rate sufficient to provide heat in amounts of at least 2000 B.t.u. per minute per cubic foot of such three foot portion, and the molten copper is tapped from the furnace substantially without the formation of a pool of molten metal in the bottom of the furnace.

17. A method according to claim 16 in which a furnace is provided which is round in its transverse cross-section, the inside surface of said furnace is sloped inwardly in said smaller bottom portion, said copper cathodes are disposed in random disposition in said column, and the rate of injection of said hot products of combustion is sufficient to provide heat in amounts of at least 3000 B.t.u. per minute per cubic foot of said lowermost three foot portion of said furnace.

18. In a vertical melting furnace, means for charging metal to be melted into the top of the furnace, means adjacent the furnace bottom for tapping molten metal from the furnace, the inside wall surface of said furnace being sloped inwardly in at least a portion of the furnace, an intermediate point in said furnace, the portion of the furnace below said intermediate point being smaller in transverse cross-section than the remaining portion of the furnace above said intermediate point, and a plurality of burner bodies mounted on the furnace walls in each of a plurality of banks with each burner body in each bank in spaced relationship to each other about the furnace perimeter and each bank in spaced vertical relationship to each other bank, at least one of said banks of burner bodies being disposed in said smaller portion of said furnace, and at least another of said banks of burner bodies being disposed adjacent said intermediate point.

19. A furnace according to claim 18 in which said furnace is round in transverse cross-section, the walls of said smaller portion of the furnace slope inwardly, the furnace bottom slopes toward said tapping means and the uppermost bank of burners in said smaller portion of the furnace is disposed adjacent to the top of said smaller portion of the furnace.

20. A furnace according to claim 19 in which at least one bank of burner bodies is disposed above said smaller portion of the furnace.

21. A continuous method of melting a column of copper shapes in a vertical furnace in which the column is supported in part at least by unmelted portions stacked up from the bottom of the furnace and in which the molten copper descends as a consequence of heat produced by a melting stream injected into the bottom portion of the furnace, which method comprises injecting into the bottom portion of the furnace a melting stream obtained by uniting a stream of fuel with a stream of oxygen-containing gas in amounts to provide insufficient oxygen in the melting stream to produce copper containing more than .05% oxygen by weight, said melting stream being ignited prior to its contact with said column, the melting stream being injected at a rate to provide heat in the lowermost three foot portion of the furnace in amounts not less than 1500 B.t.u. per minute per cubic foot of such three foot portion, and tapping the molten copper continuously to remove the same substantially without the formation of a pool of molten metal in the bottom of the furnace.

References Cited by the Examiner

UNITED STATES PATENTS

| | | | |
|---|---|---|---|
| 1,192,102 | 7/16 | Orr | 158—109 |
| 1,198,434 | 9/16 | Garred | 75—76 |
| 1,204,926 | 11/16 | Antisell | 75—76 |
| 1,295,086 | 2/19 | Eddison | 158—109 |
| 1,827,174 | 10/31 | Tama | 75—65 |
| 1,882,571 | 10/32 | Hamlin | 75—65 |
| 1,903,497 | 4/33 | Alexander | 75—65 |
| 2,124,860 | 7/38 | Miller | 75—65 |
| 2,265,284 | 12/41 | Hulme | 75—76 |
| 2,283,163 | 5/42 | Brassert | 266—33 |

| | | | |
|---|---|---|---|
| 2,436,124 | 2/48 | Sklenar | 75—65 |
| 2,741,557 | 4/56 | Wolf | 75—76 |
| 2,886,304 | 5/59 | Guthrie | 266—33 |
| 2,952,533 | 9/60 | Cuscoleca | 266—29 |
| 2,986,458 | 5/61 | Johnson | 266—29 |
| 2,989,397 | 6/61 | Kuzell | 75—76 |
| 3,070,437 | 12/62 | Bacheldor | 75—65 |
| 3,148,973 | 9/64 | Holowaty | 266—29 |

OTHER REFERENCES

Metals Handbook, 1948 edition, American Society for Metals, Cleveland, Ohio, pages 903–907.

DAVID L. RECK, *Primary Examiner.*

WINSTON A. DOUGLAS, BENJAMIN HENKIN,
*Examiners.*

UNITED STATES PATENT OFFICE
CERTIFICATE OF CORRECTION

Patent No. 3,199,977                                           August 10, 1965

Albert J. Phillips et al.

It is hereby certified that error appears in the above numbered patent requiring correction and that the said Letters Patent should read as corrected below.

Column 4, lines 67 and 68, for "portion" read -- portions --; column 7, line 62, for "feautre" read -- feature --; line 75, after "also" insert a comma; column 8, line 40, for "highst total oxygen" read -- highest total oxygen content --; line 50, for "stoichiometic" read -- stoichiometric --; column 9, line 49, after "for" insert -- the --; column 12, line 13, strike out "dry", first occurrence; same line 13, after ".5%" insert -- hydrogen or .5% --; line 24, for "belived" read -- believed --; column 14, line 73, for "substantally" read -- substantially --; column 15, line 6, for "bases" read -- gases --; column 17, line 19, for "acorss" read -- across --; column 20, line 30, for "exchangers" read -- exchanger --; column 23, line 64, for "th" read -- the --; column 24, line 70, after "found" insert a comma; column 26, in the table, under the column heading "Test 4" fourth entry, for "0.29" read -- .029 --; column 27, line 54, for "elss" read -- less --; column 29, line 50, for "Ract" read -- Race --.

Signed and sealed this 8th day of February 1966.

(SEAL)
Attest:

ERNEST W. SWIDER                               EDWARD J. BRENNER
Attesting Officer                                 Commissioner of Patents